US006606745B2

(12) United States Patent
Maggio

(10) Patent No.: US 6,606,745 B2
(45) Date of Patent: Aug. 12, 2003

(54) METHOD AND SYSTEM FOR COMMUNICATING ADVERTISING AND ENTERTAINMENT CONTENT AND GATHERING CONSUMER INFORMATION

(76) Inventor: Frank S. Maggio, 9913 Sago Point Dr., Largo, FL (US) 33777

( * ) Notice: Subject to any disclaimer, the term of this patent is extended or adjusted under 35 U.S.C. 154(b) by 0 days.

(21) Appl. No.: 09/820,482

(22) Filed: Mar. 29, 2001

(65) Prior Publication Data

US 2002/0046098 A1 Apr. 18, 2002

Related U.S. Application Data

(60) Provisional application No. 60/239,631, filed on Oct. 12, 2000.

(51) Int. Cl.⁷ .............................. H04N 7/16; H04N 7/173
(52) U.S. Cl. ............................... 725/23; 725/8; 725/13; 725/22; 725/24
(58) Field of Search ................................ 705/14; 703/13, 703/22, 23, 24, 8

(56) References Cited

U.S. PATENT DOCUMENTS

| | | | | |
|---|---|---|---|---|
| 4,809,013 A | * | 2/1989 | Cho et al. ........................ | 346/19 |
| 4,876,592 A | | 10/1989 | Von Kohorn ................. | 358/84 |
| 4,989,234 A | * | 1/1991 | Schakowsky et al. .... | 379/92.03 |
| 5,035,422 A | | 7/1991 | Berman ........................ | 273/439 |
| 5,057,915 A | | 10/1991 | Von Kohorn ................. | 358/84 |
| 5,108,115 A | | 4/1992 | Berman et al. .............. | 273/439 |
| 5,227,874 A | | 7/1993 | Von Kohorn ................. | 358/84 |
| 5,271,626 A | | 12/1993 | Llenas et al. ................ | 273/430 |
| 5,283,734 A | | 2/1994 | Von Kohorn ................ | 364/412 |
| 5,438,355 A | | 8/1995 | Palmer .......................... | 348/1 |
| 5,453,015 A | | 9/1995 | Vogel | |
| 5,473,673 A | * | 12/1995 | Van Wijk et al. ......... | 379/92.01 |
| 5,508,731 A | | 4/1996 | Kohorn .......................... | 348/1 |
| 5,518,253 A | | 5/1996 | Pocock et al. ............... | 273/439 |

(List continued on next page.)

FOREIGN PATENT DOCUMENTS

| | | | | |
|---|---|---|---|---|
| EP | 0711076 | * | 10/1995 | .......... H04N/7/173 |
| WO | WO 01/29689 | * | 4/2001 | ........... G06F/17/00 |

OTHER PUBLICATIONS

A System for Measuring the Performance of Television Advertising, published at www.iagr.net/default.jsp, copyright 2002 by Intermedia Advertising Group, Inc.

Primary Examiner—James W. Myhre
(74) Attorney, Agent, or Firm—King & Spalding LLP

(57) ABSTRACT

An effective, entertaining and rewarding way to advertise. Transforms advertising from something Consumers avoid to a drawing card that attracts the Consumers. Communicates Consumer Rewarded Advertising Vehicle Immersive Ad Bundles ("CRAV Ads"). The CRAV Ads include a Vignette, a Query, an optional Alert, and an optional Answer. Promoters can sell CRAV Ads to Advertisers. Promoters or Advertisers can use the Broadcast Network to promote future CRAV Ads. Promoters can use the Broadcast Network, the Device, the Information Gathering System, and the Data Storage Center to communicate the CRAV Ads to Consumers and to interact with Consumers. Promoters or Advertisers can use the Device, the Information Gathering System, and the Data Storage Center to gather Consumers' responses to CRAV Ads. Promoters can edit and/or distribute registration and response information to Advertisers. Promoters can select winners and distribute prizes.

74 Claims, 21 Drawing Sheets

U.S. PATENT DOCUMENTS

| | | | |
|---|---|---|---|
| 5,530,469 A * | 6/1996 | Garfinkle | 725/116 |
| 5,539,822 A | 7/1996 | Lett | 380/20 |
| 5,545,088 A | 8/1996 | Kravitz et al. | 463/40 |
| 5,643,088 A | 7/1997 | Vaughn et al. | 463/40 |
| 5,679,077 A | 10/1997 | Pocock et al. | 463/19 |
| 5,697,844 A | 12/1997 | Von Kohorn | 463/40 |
| 5,713,795 A | 2/1998 | Kohorn | 463/17 |
| 5,717,923 A | 2/1998 | Dedrick | 395/613 |
| 5,734,413 A | 3/1998 | Lappington et al. | 348/12 |
| 5,743,745 A | 4/1998 | Reintjes | 434/307 |
| 5,759,101 A | 6/1998 | Von Kohorn | 463/40 |
| 5,774,664 A | 6/1998 | Hidary et al. | 395/200.48 |
| 5,778,181 A | 7/1998 | Hidary et al. | 395/200.48 |
| 5,794,210 A | 8/1998 | Goldhaber et al. | 705/14 |
| 5,823,879 A | 10/1998 | Goldberg et al. | 463/42 |
| 5,855,008 A | 12/1998 | Goldhaber et al. | 705/14 |
| 5,893,075 A | 4/1999 | Plainfield et al. | 705/14 |
| 5,915,243 A | 6/1999 | Smolen | 705/14 |
| 5,916,024 A | 6/1999 | Von Kohorn | 463/40 |
| 5,935,002 A | 8/1999 | Falciglia | 463/19 |
| 5,936,661 A * | 8/1999 | Trew | 725/114 |
| 5,983,196 A | 11/1999 | Wendkos | 705/14 |
| 5,999,914 A | 12/1999 | Blinn et al. | 705/26 |
| 6,018,768 A | 1/2000 | Ullman et al. | 709/218 |
| 6,061,660 A | 5/2000 | Eggleston et al. | 705/14 |
| 6,064,978 A | 5/2000 | Gardner et al. | 705/10 |
| 6,070,145 A * | 5/2000 | Pinsley et al. | 705/10 |
| 6,102,406 A | 8/2000 | Miles et al. | 273/430 |
| 6,151,586 A | 11/2000 | Brown | 705/14 |
| 6,161,059 A * | 12/2000 | Tedesco et al. | 700/232 |
| 6,183,366 B1 | 2/2001 | Goldberg et al. | 463/42 |
| 6,205,432 B1 | 3/2001 | Gabbard et al. | 705/14 |
| 6,212,262 B1 | 4/2001 | Kamel | 379/88.22 |
| 6,216,111 B1 | 4/2001 | Walker et al. | 705/14 |
| 6,216,129 B1 | 4/2001 | Eldering | 707/10 |
| 6,236,975 B1 | 5/2001 | Boe et al. | 705/7 |
| 6,267,675 B1 | 7/2001 | Lee | 463/40 |
| 6,379,251 B1 * | 4/2002 | Auxier et al. | 463/42 |
| 2001/0018668 A1 | 8/2001 | Yanase et al. | |
| 2001/0032125 A1 * | 10/2001 | Bhan et al. | 705/14 |
| 2001/0037232 A1 | 11/2001 | Miller | |
| 2002/0046095 A1 * | 4/2002 | Wallace | 705/14 |
| 2002/0049634 A1 * | 4/2002 | Longinotti | 705/14 |
| 2002/0062481 A1 * | 5/2002 | Slaney et al. | 725/42 |
| 2002/0077902 A1 * | 6/2002 | Marcus | 705/14 |
| 2002/0116256 A1 * | 8/2002 | De Rafael et al. | 705/14 |

* cited by examiner

FIG. 14

CRAV Immersive Ad Bundle Program Worksheet

| | |
|---|---|
| SHOW: | Lawyers in Love |
| Time Slot: | 8 pm EST/7 pm CST |
| | 8 pm MST/7pm PST |

| | |
|---|---|
| Length: | 60 min. |
| Ad mins/show: | 16 |
| Avg. Audience: | 7,000,000 viewers |

| | |
|---|---|
| Typical # Spots: | 32  30 second spots/show |
| $ / SPOT: | $300,000 |
| Cost/100- view: | $42.86 per 30 seconds |

| | |
|---|---|
| Revenues.show: | $9,600,000 |
| Expenses/show: | $8,000,000 |
| Avg. profit/show: | $1,600,000 |

SUBSTITUTION ANALYSIS:

| | | |
|---|---|---|
| CRAV Bundles: | 2 | $1,700,000 per spot |
| Time per bundle: | 2 minutes = | $2,400,000 replacement and fees |
| Reward % of fee: | 29.41% | $3,400,000 after Immersion Rewards |
| CRAV data cost:: | 15.00% of fees, or | $ 510,000 for all CRAV ads |
| CRAV promotion: | $400,000 additional promotion dollars | |

| | |
|---|---|
| Est. increase: | 30% larger audience |
| Est. new audience: | 9,100,000 |

| | |
|---|---|
| Remaining ads: | 24 |
| Ad fee increase: | 25.00% |
| New $ / ad: | $375,000 |
| New Cost / 1000: | $41.21 per:  30 seconds |

| | |
|---|---|
| Ad Revenues: | $9,000,000 |
| CRAV Revenues: | $3,400,000 |
| Immers. Rewards: | -$1,000,000 |

| | |
|---|---|
| CRAV Promo: | -$400,000 |
| CRAV Data: | -$510,000 |
| Expenses/show: | -$8,000,000 |

| | |
|---|---|
| Est. profit/show: | $2,490,000 |
| Profit Increase: | $  890,000 vs. non-CRAV ads |
| Profit Increase: | 55.63% vs. non-CRAV ads |

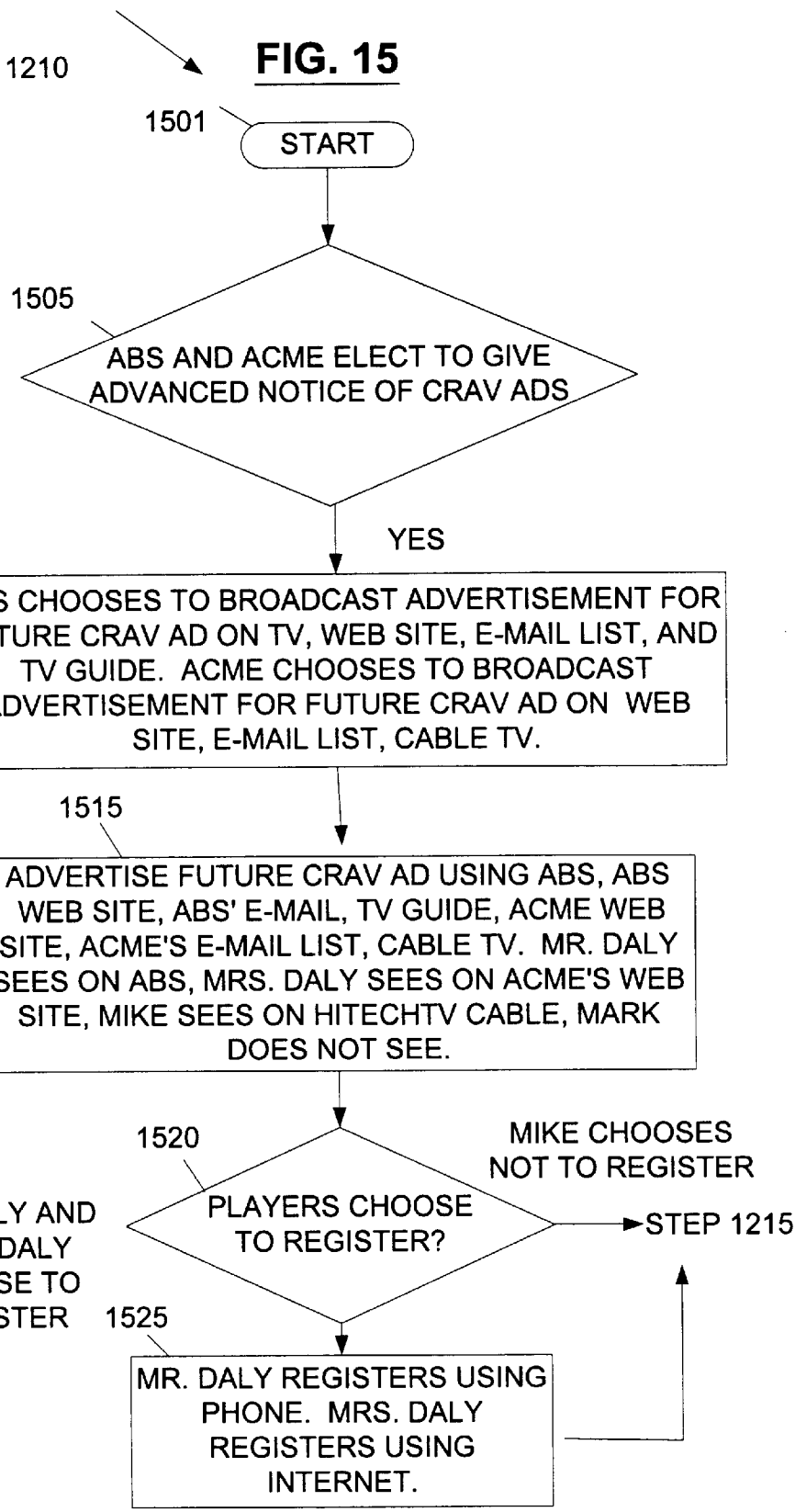

FIG. 16

IDENTIFICATION INFORMATION

| | | |
|---|---|---|
| NAME: Mark Daly | PIN: 1234 | |
| SS#: 238-33-5212 | Birthday: 07/05/62 | |
| PHONE: 727-541-1100 | E-mail: mdaly@worldwide.net | Wins: 17-Aug-00 NBS2103 |
| | Address: 5623 Bayou Court, Largo, FL | |

DEMOGRAPHIC INFORMATION

LEVEL I

| | | |
|---|---|---|
| Sex: M | Race: W | Ann. Earn: 75K |
| Zip Code: 33771 | Weight: 185 | Education: 14 |
| # Child: 2 | Height: 5' 10" | Political: D |
| Marital: D | Occupation: Construction | Religious: SB |

LEVEL II

| Date add | Info | | |
|---|---|---|---|
| 21-Jul-00 | ABS0833 | Number of Computers: | 2 |
| | | Number of vehicles: | 1 |
| 17-Sep-00 | ABS0734 | Favorite network: | ABS |

HISTORICAL RESPONSE INFORMATION

| Date | Spot Code | Resp. A | Resp. B | Resp. C | Resp. D | Resp. E | Resp. F | Resp. G |
|---|---|---|---|---|---|---|---|---|
| 21-Jul-00 | ABS0712 | 1 | 4 | 2 | 2 | 3 | | |
| 21-Jul-00 | ABS0734 | 4 | 3 | 3 | 4 | 2 | 2 | |
| 21-Jul-00 | ABS0812 | 1 | 3 | 5 | 3 | 1 | | |
| 21-Jul-00 | ABS0833 | 4 | 5 | 5 | 2 | 4 | 3 | |
| 28-Jul-00 | NBS2103 | 5 | 2 | 1 | | | | |
| 28-Jul-00 | NBS2122 | 2 | 3 | 4 | | | | |
| 04-Aug-00 | MSN1820 | 4 | 3 | 3 | 2 | 4 | 4 | 1 |
| 11-Aug-00 | ABS0712 | 1 | 3 | 2 | | | | |
| 11-Aug-00 | ABS0734 | 1 | 1 | 1 | 2 | 2 | | |
| 11-Aug-00 | ABS0812 | 3 | 2 | 4 | 2 | 2 | | |
| 11-Aug-00 | ABS0833 | 2 | 4 | 3 | 4 | 3 | 1 | 1 |
| 11-Aug-00 | ABS0845 | 4 | 3 | 2 | 3 | 2 | | |
| 18 Aug-00 | NBS2103 | 2 | 4 | 3 | 2 | 3 | | |
| 18-Aug-00 | NBS2122 | 1 | | 2 | | | | |
| 17-Sep-00 | ABS0712 | 1 | 4 | 1 | 3 | 2 | 1 | |
| 17-Sep-00 | ABS0734 | 3 | 2 | 1 | 2 | | | |
| 17-Sep-00 | ABS0812 | 2 | 1 | 1 | 1 | 3 | | |
| 17-Sep-00 | ABS0833 | 3 | 3 | 1 | | 1 | | |
| 23-Oct-00 | MSN1820 | 3 | 3 | 1 | | 1 | | |

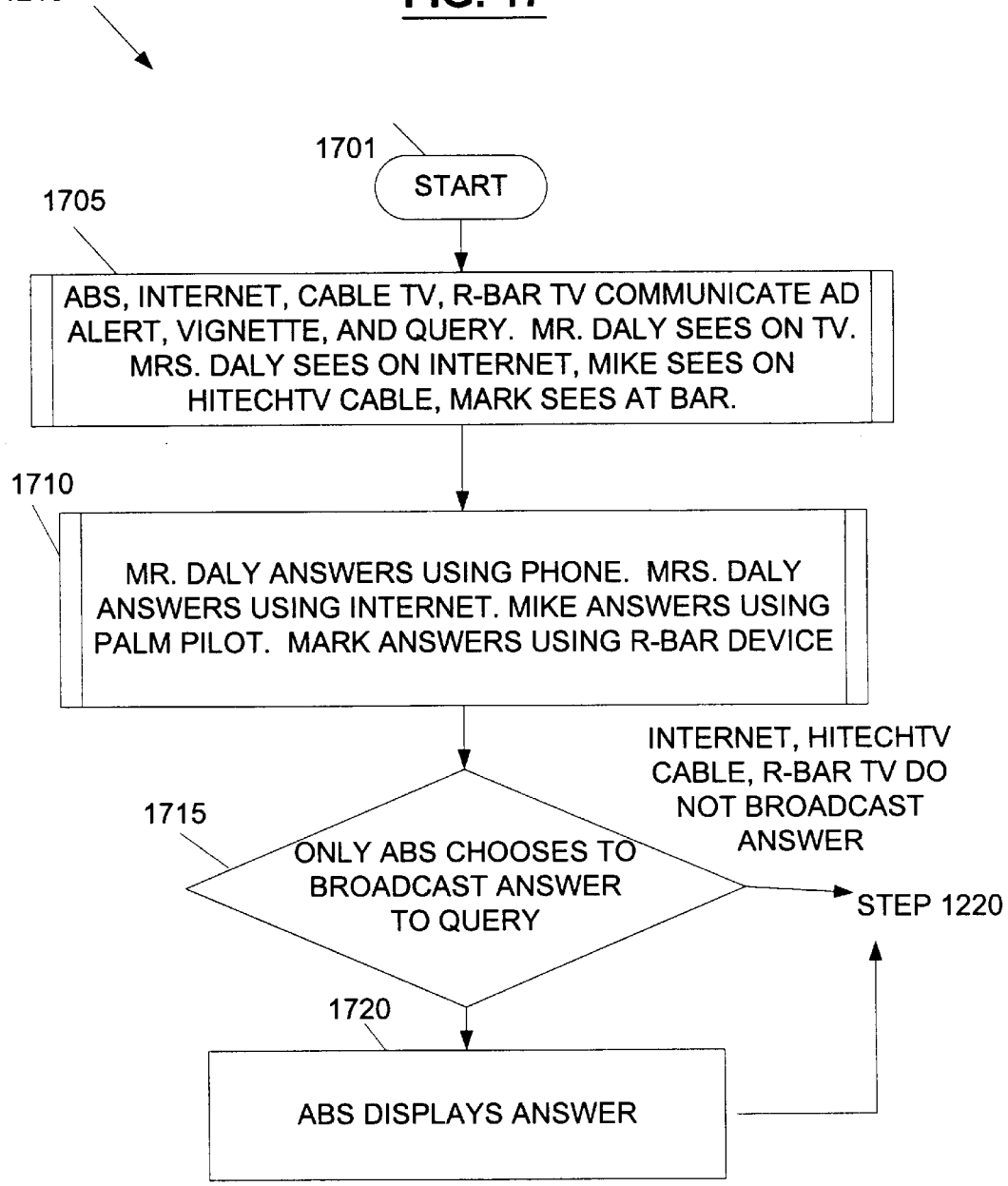

1805 — ALERT
Memorizing the following ACME CRAV Ad could make you a winner of 1 of 50 new convertibles.

1810 — VIGNETTE
(Show ACME Commercial which presents model number of new car with side impact air bags.)

1820a — QUERY - Question 1:
What new ACME Model features side impact air bags?

1820b — QUERY - Question 2:
When do you plan on buying a new car?

1820c — QUERY - Question 3:
Who should be President?

1830 — ANSWER

XP 2030

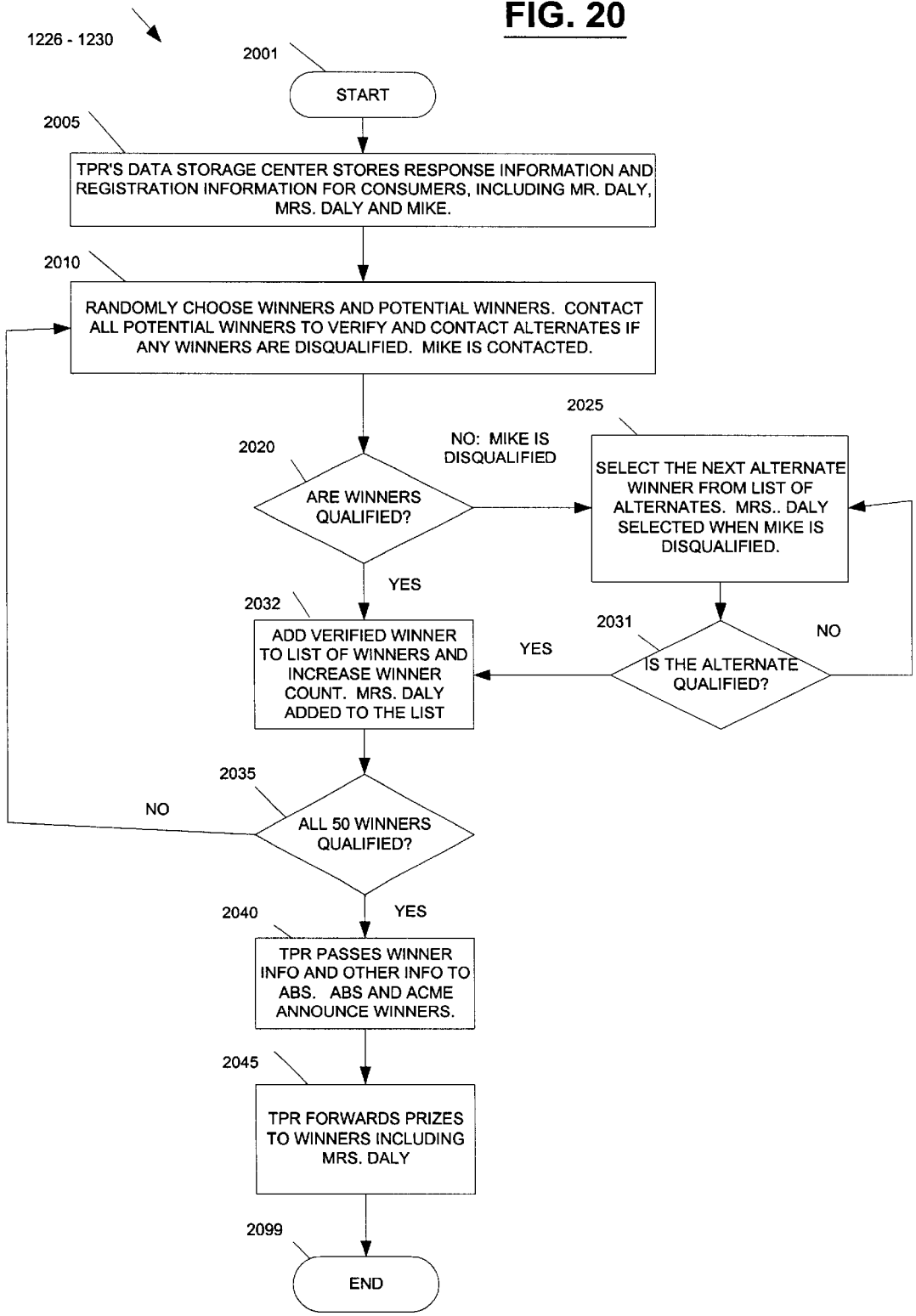

METHOD AND SYSTEM FOR COMMUNICATING ADVERTISING AND ENTERTAINMENT CONTENT AND GATHERING CONSUMER INFORMATION

RELATED APPLICATION

This application claims priority under 35 U.S.C. 119 to U.S. Provisional Patent Application 60/239,631, filed on Oct. 12, 2000, entitled "System and Method for Using Linked Sponsorships to Increase Mass-Market Appeal of Content", which is hereby fully incorporated herein by reference.

FIELD OF THE INVENTION

The present invention relates to techniques for communicating content, and more particularly to techniques for communicating advertising content and entertainment content, including promoting and communicating ads and gathering consumer information.

BACKGROUND OF THE INVENTION

In the traditional advertising model, media (i.e., TV networks, radio stations, newspapers, magazines) develops entertainment content (e.g., a TV show) of interest to Consumers. The Consumers are persons who may use an Advertisers commodity or service, and who view, hear, read, or otherwise absorb the entertainment content, as well as advertising content ("ads"). The Advertisers are entities that distribute the ads to induce the Consumers to buy, use, or do something. The media delivers the entertainment content and the ads to the Consumers (i.e., over the air, by cable transmission, by print media mass distribution). Media may charge the Consumers for the entertainment content delivery, but typically media receives most revenue from the Advertisers in exchange for delivering ads with the entertainment content.

Promoters initiate, develop, generate, and/or distribute entertainment content attracting many of the Consumers and, in turn, attracting the Advertisers. The Advertisers sponsor the entertainment content by paying the Promoters to deliver the ads with the entertainment content. Advertising fees generally increase as the number of the Consumers absorbing the ads increases. The Promoters use the advertising fees to offset the Promoter's costs to produce and distribute the advertising content, and to make a profit. The Consumers usually do not pay to see, hear, or otherwise absorb the entertainment content. The Consumers also do not receive payment for seeing, hearing, or otherwise absorbing the ads. The Consumers' traditional reward is the ability to see, hear, or otherwise absorb and enjoy the entertainment content for little or no charge, in exchange for tolerating the ads.

Recent technological advancements (i.e., the Internet) have caused an increase in possible broadcast outlets. With this increase, distracted by multiple entertainment forms. As a result, the Advertisers have more difficulty reaching mass numbers of the Consumers. In addition, the Promoters have more difficulty guaranteeing many of the Consumers will watch, hear, or otherwise absorb the entertainment content and the ads. This phenomena has led to lower advertising fees, and thus lower profitability to the Promoters.

The Advertisers' goal is to provide the Consumers with ads they will remember that include information on the Advertisers' product or service. However, the Consumers typically ignore and avoid the ads. The Consumers often "tune out", change the channel, or walk away when the ads appear. In addition, the Consumers increasingly turn to less advertising-dependent entertainment forms (i.e., premium channels), or use technology (i.e., video recorders, personal recording devices) to skip the ads.

Advertising can be divided into two classes: mass media advertising and targeted advertising. Mass media advertising (i.e., broadcast TV, radio, and magazine) sends broadly based advertising messages to a wide spectrum of the Consumers. Targeted advertising focuses on delivering specific, personalized advertising to the Consumers that meet a demographic profile specified by the Advertisers. Mass media advertising is usually less expensive per impression than targeted advertising. However, targeted advertising is usually more effective, and has become less expensive per impression as technology has progressed. As a result, the effectiveness of mass media advertising has been questioned.

In view of the foregoing, there is a need for a cost-effective, entertaining, rewarding, and effective way of mass media advertising. In addition, there is a need for a cost-effective way to gather information useful to the Advertisers.

SUMMARY OF THE INVENTION

The present invention solves the above problems by providing a cost-effective, entertaining, rewarding, and effective way to present entertainment content and ads to a mass audience. For example, the present invention may transform advertising from something Consumers avoid to a drawing card that attracts the Consumers. The Consumers can be presented with an opportunity to remember ads and to win valuable prizes. This may increase viewership, consumer entertainment, and advertising immersion.

The present invention may communicate Consumer Rewarded Advertising Vehicle Immersive Ad Bundles ("CRAV Ads"). The CRAV Ads may be an ad including an Advertising Vignette ("Vignette") and a Verification Query ("Query"). An optional Immersion Alert ("Alert") may also be added in the preferred embodiment. In addition, an optional Correct Answer ("Answer") may be added in the preferred embodiment. The CRAV Ads may be any duration. The CRAV Ads may be visual and/or audible. The CRAV Ads may be spoken, printed, displayed, heard, or communicated by any possible means, or any combination of possible means. The CRAV Ad, or a series of CRAV Ads, may also be the basis for an entire show, particularly of the game show genre.

Another option, called a "Sneak Peek" Vignette, may be used to promote the CRAV Ads. The Sneak Peek Vignette may be identical to the CRAV Ad Vignette. The Sneak Peek may also contain other information that helps the Consumers answer the Query.

The present invention can comprise a Broadcast Network, the Consumers, a Response Device, an Information Gathering System, and a Data Storage Center. The Consumers, Advertisers, Promoters, or other entities, can use the present invention. The Consumers can be persons who may use the Advertiser's commodity or service, who view, hear, read, or otherwise absorb the entertainment content and the ads. The Advertisers can be entities that distribute the ads to induce the Consumers to buy, use, or do something. The Promoters can initiate, develop, generate, and/or distribute entertainment content attracting many of the Consumers, and will in turn attract the Advertisers. While the invention has been discussed in the context of the Consumers, the Promoters, and the Advertisers, those experienced in the art will recognize that other entities can be used.

The Broadcast Network can be a means of connecting the Consumers with the entertainment content and the ads. The Device can be a means of communicating the consumer information to the Information Gathering System. The Information Gathering System can be a means of forwarding the information to the Data Storage Center. The Data Storage Center can be a means for storing and using the consumer information. The consumer information can include registration and response information. The registration information can include personal information, such as name, address, phone number, etc. The response information can include answers to the Query questions.

The Promoters can sell the CRAV Ads to the Advertisers. The Promoters or the Advertisers can use the Broadcast Network to promote future CRAV Ads. The Promoters can use the Broadcast Network, the Device, the Information Gathering System, and the Data Storage Center to communicate the CRAV Ads to the Consumers and to interact with the Consumers. The Promoters or the Advertisers can use the Device, the Information Gathering System, and the Data Storage Center to gather the Consumers' responses to the CRAV Ads. The Promoters can edit and/or distribute the registration and response information to the Advertiser or other interested third parties. The Promoters can select the winners and distribute the prizes.

A privacy option can be included to implement privacy protection for the Consumers that respond to the CRAV Ads, who have provided personal and confidential data while registering. This option helps ensure security, data protection, and isolation levels.

DESCRIPTION OF THE DRAWINGS

FIG. 9, are picture diagrams illustrating an exemplary nationwide network for gathering CRAV Ad responses.

FIG. 14 is a chart illustrating how the ad price is determined in an exemplary embodiment.

FIG. 15 is a picture flow diagram illustrating an exemplary CRAV Ad process for ABS and ACME to promote future CRAV Ads.

FIG. 16 is a chart illustrating a CRAV record in an exemplary embodiment.

FIG. 17 is a flow chart illustrating how ABS broadcasts the CRAV Ads in an exemplary embodiment.

FIG. 18 illustrates the CRAV Ad the Consumers see in an exemplary embodiment.

FIG. 20 is a flow diagram illustrating how the CRAV Ads are answered by the Dalys in an exemplary embodiment.

DETAILED DESCRIPTION OF THE INVENTION

Figure 1:
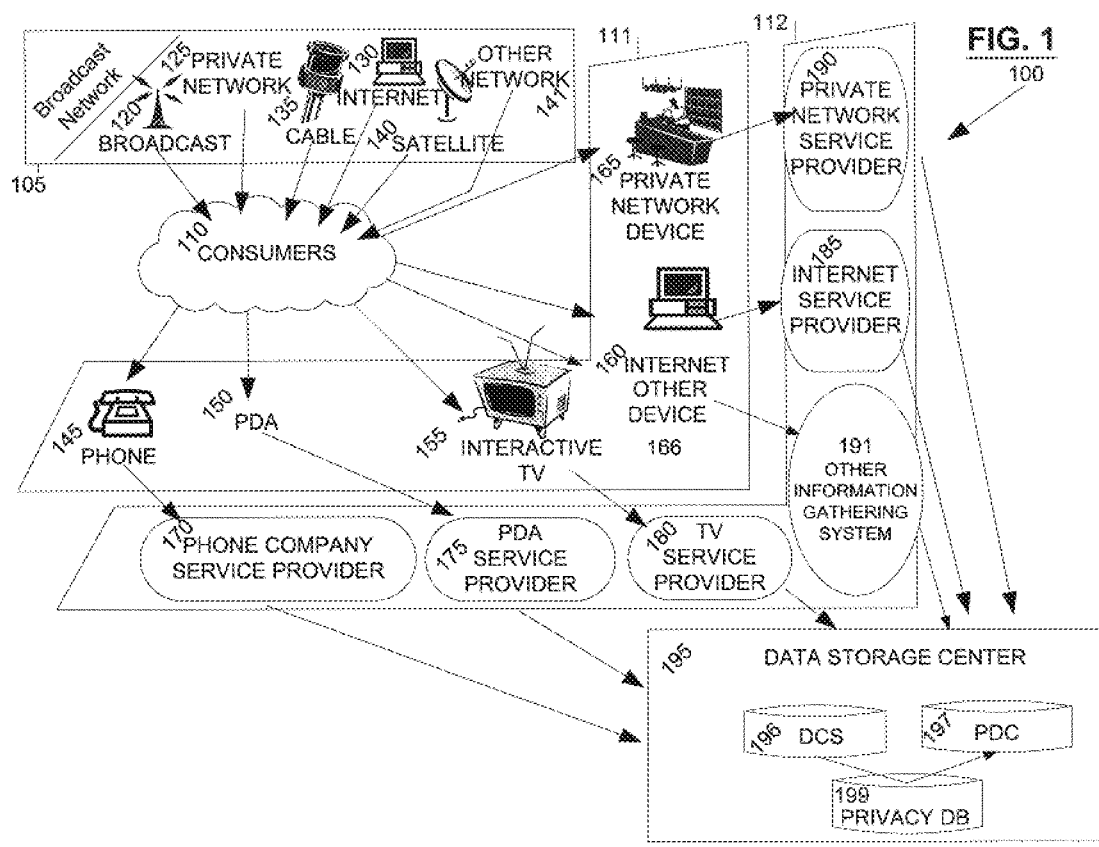
FIG. 1 is a block diagram illustrating the primary components of an exemplary embodiment of the present invention.

The present invention solves the above problems by providing a cost-effective, entertaining, rewarding, and effective way to present ads to an audience. For example, the present invention transforms advertising from something Consumers avoid to a drawing card that attracts the Consumers. The Consumers are presented with an opportunity to win valuable prizes. This increases viewership, consumer entertainment, and advertising immersion.

The present invention may be used by Promoters to increase an ads' appeal, while substantially and cost-effectively enhancing an Advertisers' promotion and retention of its products and services. When compared to traditional mass media advertising, an exemplary embodiment delivers ads that cause the Consumers to fully immerse themselves in the ad. An exemplary embodiment can deliver ads in print, by radio, by TV, as a game show, or by any other method that communicates with the Consumers.

Immersion is a heightened attention level that causes the Consumers to remember the ads. Immersion is the highest, most effective, and valuable attention level. Immersion helps the Advertisers achieve a maximized share of the Consumers' mind for their product. Products are remembered easier and faster than competing products.

Immersion is enhanced by several methods. First, immersion is enhanced when the ad triggers an immediate emotional response within the brain, such as a warning or alert signal. This signal causes the Consumers to pay more attention to the ads, and increases the likelihood the Consumers will remember the ads. When the Consumers interact with the ads, as opposed to passively viewing or hearing the ads, the Consumers are more likely to remember the ads. A memorization request also increases immersion by testing the Consumers ability to recall the ads. In addition, extended exposure, which is obtained by a longer effective ad length, increases the likelihood of immersion. Effective length begins from the first moment one recognizes the brand advertised. Another advertising technique that increases immersion is using alternate, multiple media vehicles for distributing advertising (i.e., using print or Internet-based advertising simultaneously, or following, TV advertising). Rewards also help to create immersion because the Consumers like challenges and rewards, and likable ads are more readily and easily recalled.

CRAV Ad Description

Consumer Rewarded Advertising Vehicle Immersive Ad Bundles ("CRAV Ads") provide a process for Promoters to increase viewership and immersion. A CRAV Ad example will be discussed while referring to FIG. 18 later in this document. However, for purpose of defining the CRAV Ad, it is useful to refer to FIG. 18 at this time.

Turning now to FIG. 18, an exemplary CRAV Ad is displayed. The CRAV Ad is an ad including at least an Advertising Vignette ("Vignette") 1810 and a Verification Query ("Query") 1820. An Immersion Alert ("Alert") 1805 can also be included. In addition, an optional Correct Answer ("Answer") 1830 may be added. These parts create a CRAV Ad that may be any duration. The CRAV Ads may be visual and/or audible. The CRAV Ad may be spoken, printed, displayed, heard, or communicated by any other possible means, or any combination of possible means. A CRAV Ad, or a series of CRAV Ads may also be the basis for an entire show.

Some or all of the components of the Query 1820 may be "detached" from the Vignette 1810 (i.e., the Vignette 1810 may be in print and the Query 1820 may be posted on-line or by phone). In addition, the response time for the Query 1820 may be limited to cause the Consumers to memorize the Vignette 1810 for expedited recall (from memory) when asked the Query 1820. Similarly, the Alert 1805 and/or the Answer 1830 may be detached from the Vignette 1810 and/or the Query 1820.

The Alert 1805, which is optional (as indicated by the dashed lines), is a warning to the Consumers that the upcoming Vignette 1810 should be memorized so the Consumers may become eligible to win a reward. The Alert 1805 could be any cue or operational procedure that leads the Consumers to believe that immersion may lead to a reward. The Alert 1805 may be as simple as a logo (such as a CRAV logo), a sound, or some other discrete notice. The Alert 1805 may also include much more extensive data. The Alert 1805 may include the product's brand name and information on the identity of the available rewards. By providing branding during the Alert 1805, the Advertisers effectively begin the CRAV Ad's exposure time. The Alert 1805 is an urgency signal and a memorization request. These advertising techniques increase the likelihood of the Consumer remembering the ad. The Alert 1805 may be any duration.

Following the Alert 1805, a Vignette 1810 is broadcast. The Vignette 1810 may be a conventional commercial for a product or service or any other information designed for presentation to a consuming audience. This may include key product or service benefits, pricing information, image building information, etc. The Vignette 1810 may be any duration.

Following the Vignette 1810 broadcast the Query 1820 is broadcast. The Query 1820 includes one or more questions. One question may be linked to the Vignette 1810. This question is designed to require the Consumers to remember certain information. The other questions may ask for public opinion, trivia, or other information, and these questions may be asked on-line or off-line. The Query 1820 questions may be displayed on a separate screen following the Vignette 1810, asked by a crawl-line below the entertainment content, or shown in an alternative way, such as off-line. The Query 1820 may serve to increase the effective length of the CRAV Ad, even though the traditional ad (i.e., video or audio clip) extends for a conventional duration, because the Consumers must continue concentrating on the product as advertised during the immersion verification and query response process. During the Query 1820, the Promoters or the Advertisers may provide potential multiple choice answers or require the Consumers to provide the answer without the aid of multiple choice answers. The Query 1820 includes one or more questions, and may include reward information, registration or login instructions, multiple choice answers, a "time remaining" counter, and brand information. The CRAV Ad may end following the Query 1820.

The Answer 1830, may be added and is optional, as shown by the dashed lines in the Answer 1830. The Answer 1830 extends the CRAV Ad's effective length. The Answer 1830 includes the answer or answers to the Query's 1820 one or more questions, where applicable. The Answer 1830 may also include logo or other information. The Answer 1830 may be broadcast via a TV medium, or distributed by an alternate communications medium (i.e., radio, print, Phone 145, Internet 130).

Another option, called the "Sneak Peek" Vignette, may be incorporated. The Sneak Peek may be identical to the CRAV Ad Vignette 1810. The Sneak Peek may also contain other information to help the Consumers answer the Query 1820. The Sneak Peek is not shown during the actual CRAV Ad, but is shown prior to the CRAV Ad. The Sneak Peek may be featured several minutes, hours, days, weeks, etc. before the CRAV Ad. The Sneak Peek Vignette may be indicated by a logo, sound, or another method. Alternatively, the Consumers may be informed only that the Sneak Peek will occur at some point during a particular show. The Consumers are told one or more ads are CRAV Ad Sneak Peek Vignettes. The Consumers will then pay greater attention to the particular commercial, or all the possible commercials so they may get additional information to help them answer the CRAV Ad Query 1820. For example, a Sneak Peek could read: "1 of the following 6 ads will be featured in a CRAV Ad next Sunday. Please pay attention to ALL of them, because we will not tell you at this time which ad is the CRAV Ad." This same process could apply to the Vignettes, in addition to the Sneak Peaks. Thus, for example, during the communication of numerous ads, an Alert in the form of a logo could appear on the corner of the ads, which are in the form of Vignettes. After communicating the Vignettes, one or more Queries with immersion verification questions for one or more of the Vignettes would be shown (i.e., at the bottom of the screen while the entertainment content continues). When the user calls, the user could be required to answer one or more of the shown immersion verification questions.

CRAV Ad System

FIG. 1 is a block diagram illustrating the primary components of an exemplary embodiment of the present invention. Turning to FIG. 1, the CRAV Ad system 100 includes a Broadcast Network 105, the Consumers 110, an Answering Device ("Device") 111, an Information Gathering System 112, and a Data Storage Center 195. The Consumers 110, the Advertisers, the Promoters, or other entities, use the present invention. The Consumers 110 are persons who may use the Advertiser's commodity or service, who view, hear, read, or otherwise absorb the entertainment content and the ads. The Advertisers are entities that distribute the ads to induce the Consumers to buy, use, or do something. The Promoters initiate, develop, generate, and/or distribute entertainment content attracting many of the Consumers, and in turn attracting the Advertisers. While the invention is described in the context of the Consumers, the Advertiser, and the Promoters, those experienced in the art will recognize that other entities can be used.

The Broadcast Network 105 is a means of connecting the Consumers 110 with the entertainment content and the ads. The Device 111 is a means of communicating the registration and the response information to the Information Gathering System 112. The Device 111 can also be a means of communicating with the Consumers 110 by broadcasting an immersion verification question and other questions, and subsequently forwarding related registration and response information to the Information Gathering System 112. The Information Gathering System 112 is a means of forwarding the registration and the response information to the Data Storage Center 195. The Data Storage Center 195 is a means for storing the registration and response information.

The Broadcast Network 105 may include a Broadcast TV Network 120, a Private Network 125, a Cable Network 135, an Internet Network 130, a Satellite Network 140, or any Other Network 141 (i.e., newspaper). Those experienced in the art will recognize numerous communications networks and systems (including presently available systems and future systems) may be substituted or interchanged with the Broadcast Network 105. The Device 111 can comprise a Phone 145, a Personal Digital Assistant ("PDA") 150, an Interactive TV 155, an Internet Computer 130, a Hospitality Industry Private Network (i.e., a Sports Bar and Pub Device) 165, or any Other Device 166.

The Devices 111 can include computer-related devices such as cellular phone networks, two-way pagers, and two-way contained network devices such as proprietary NTN systems found in numerous restaurants and pubs throughout the United States. Different instructions and methods may be used to register or answer. Those experienced in the art will recognize numerous devices (including presently available devices, and future devices) may be substituted or interchanged as the Device 111. In addition, those experienced in the art will recognize that one Device 111 can be used to register, and another Device 111 used to respond to the CRAV Ad.

The Information Gathering System 112 may include numerous service providers ("SPs"), including a Phone Company SP 170, a PDA SP 175, a TV SP 180, an Internet SP 185, a Private Network SP 190, and any other information gathering system 191. Those experienced in the art will recognize numerous distribution systems (including presently available systems, and future systems) may be substituted or interchanged as the Information Gathering System 112.

The Information Gathering System 112 connects to a Data Storage Center 195, which stores data gathered by the Information Gathering System 112. The Data Storage Center 195 may include a Personal Data Center ("PDC") Database 197 and a Data Compiling and Storage ("DCS") Center Database 196. The Data Storage Center 195 includes registration information and response information, random winner selection, and long-term storage of data collected for future data mining ventures. The PDC 197 stores the Consumers' personal information, which may include the name, address, social security number (which is typically obtained only from prize winners for tax reporting purposes), personal ID number, phone number, etc. The DCS 196 may store demographic data collected during registration, a CRAV ID, and CRAV Ad Query 1820 answers.

The Data Storage Center 195 may also include a Privacy Database 199. The Privacy Database 199 is used when the Promoters decide to implement privacy protection for the Consumers 110 that respond to the CRAV Ads, who have provided personal and confidential data while registering. The Privacy Database 199 requires records from the PDC 197 and the DCS 196 to match before Consumers' identities are matched with demographic and historical records. This helps ensure security, data protection, and isolation levels.

CRAV Ad Process Overview

Figure 2:
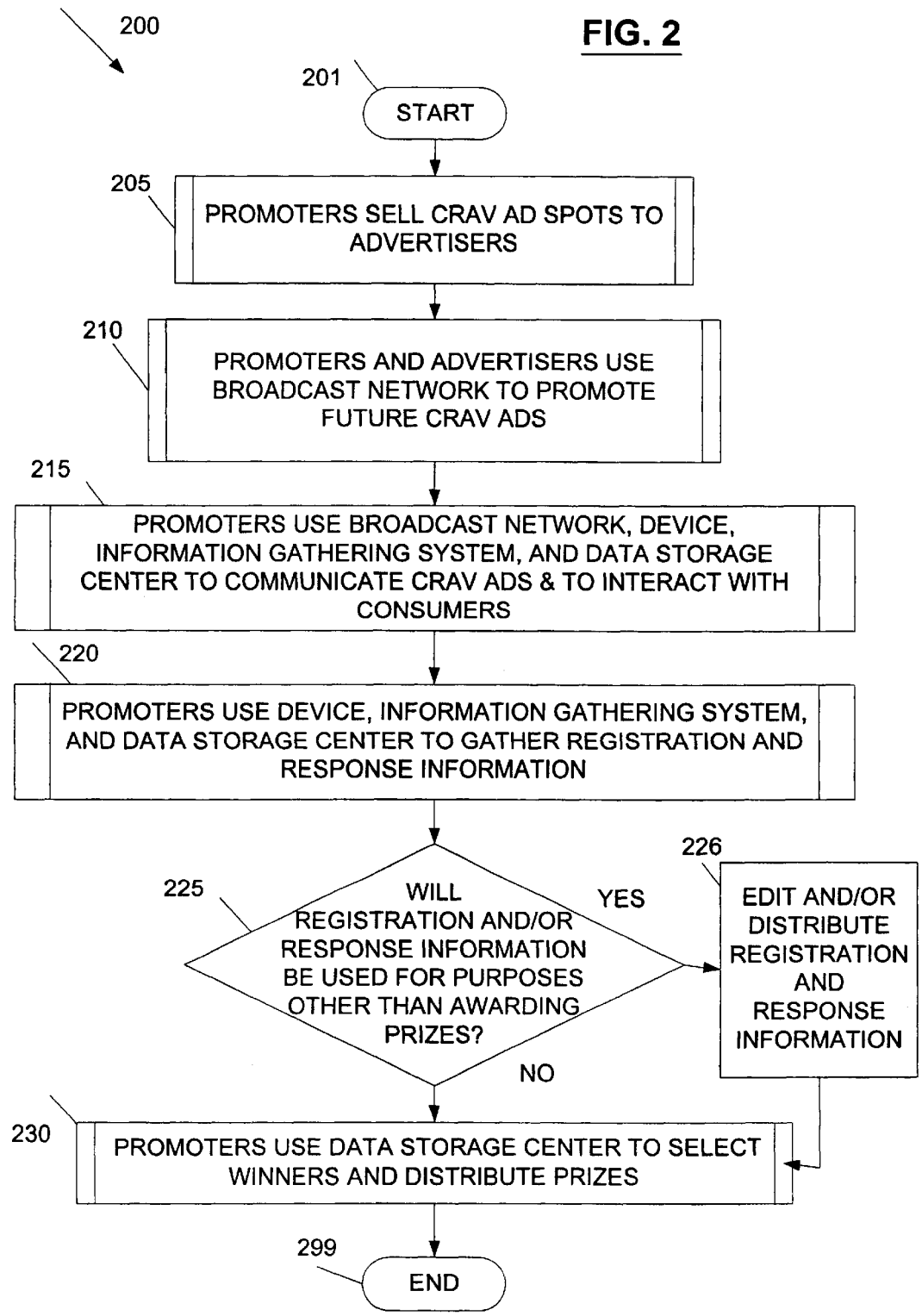
FIG. 2 is a flow diagram illustrating an overview of an exemplary CRAV Ad process.

FIG. 2 is a flow diagram illustrating an overview of an exemplary CRAV Ad process. Turning now to FIG. 2, an exemplary CRAV Ad process 200 is initiated at the "START" step 201. In step 205, the Promoters sell the CRAV Ads to the Advertisers. In step 210, the Promoters and the Advertisers use the Broadcast Network 105 to promote future CRAV Ads. In step 215, the Promoters use the Broadcast Network 105, the Device 111, the Information Gathering System 112, and the Data Storage Center 195 to communicate the CRAV Ads to the Consumers 110 and to interact with the Consumers 110. In step 220, the Promoters use the Device 111, the Information Gathering System 112, and the Data Storage Center 195 to gather the Consumers' registration information and response information. In step 225, it is determined whether or not the registration and/or the response information will be used for purposes other than awarding prizes. If the answer to step 225 is "YES" and the registration and/or the response information will be used, the process moves to step 226, where the Promoters edit and/or distribute the registration and the response information to the Advertisers and other interested entities. If the answer to step 225 is "NO" and the registration and the response information will not be used, the process moves directly to step 230. In step 230, the Promoters use the Data Storage Center select the winners and distribute the prizes. The process then proceeds to the "END" step 299 and terminates.

CRAV Ads are Sold

Figure 3:
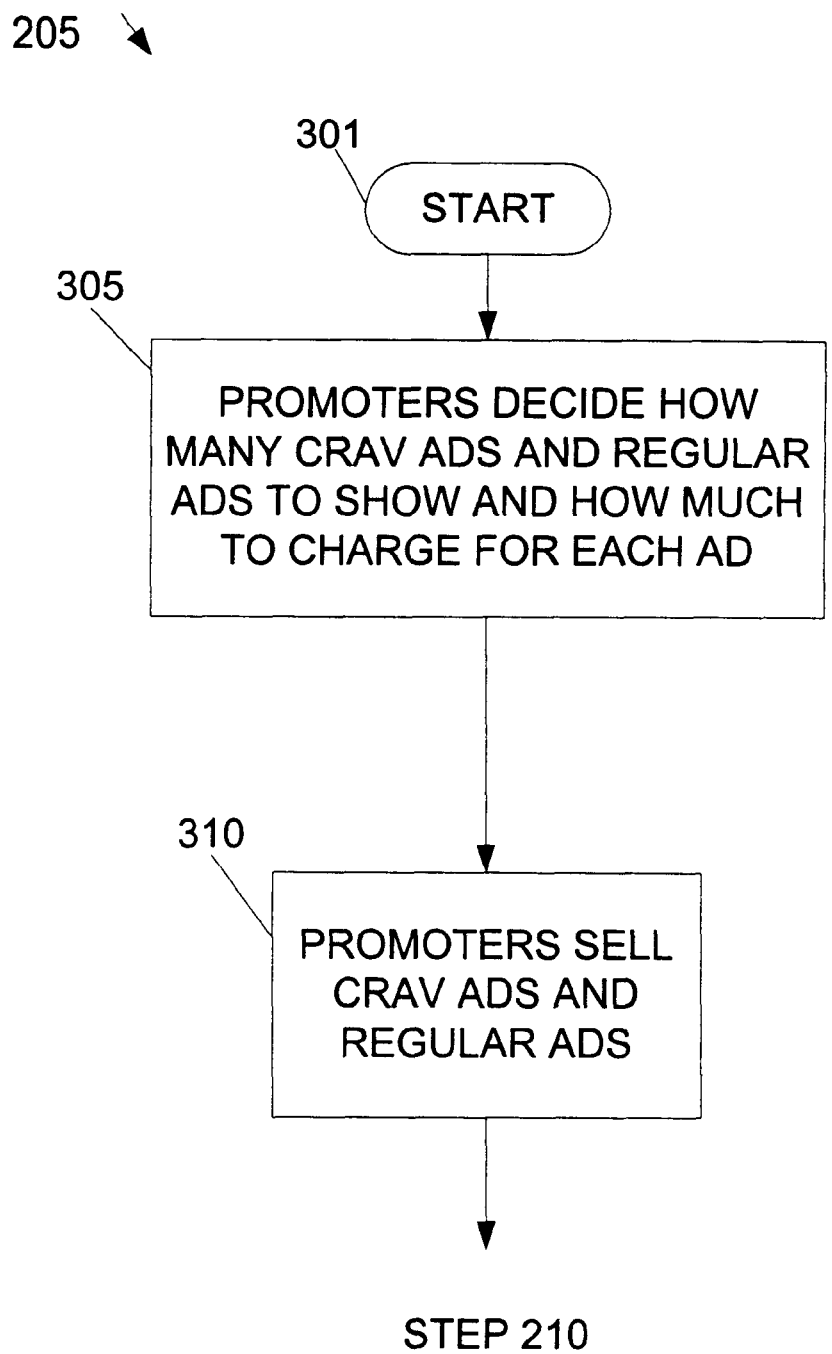
FIG. 3 is a flow diagram illustrating an exemplary process describing how the Promoters sell the CRAV Ads to the Advertisers.

FIG. 3 is a flow diagram illustrating an exemplary process describing how the Promoters sell the CRAV Ads to the Advertisers, as set forth in step 205 of FIG. 2. Turning now to FIG. 3, an exemplary CRAV Ad process 205 is initiated at the "START" step 301. In step 305, the Promoters decide how many of the CRAV Ads and the regular ads to communicate and how much to charge for each ad. In step 310, the Promoters sell the CRAV ads and the regular ads. The process then moves to step 210 of FIG. 2.

The CRAV Ads may be priced in numerous ways. For example, the price may be dependent on the program's audience size (i.e., ratings), or may be priced based on an auction or bidding process, where the CRAV Ads are rewarded to the highest bidder. To establish pricing, the Promoters may analyze the existing program profitability based on standard production, promotion, and broadcast costs. This may be offset by standard advertising fees for standard advertising. The Promoters' CRAV Ad price may include the value of a larger audience size and a higher quality of immersion among Consumers 110. This legitimizes a higher cost-per-minute advertising fee, with the additional fee revenues helping to offset CRAV Ad reward costs, CRAV Ad licensing and promotion costs, and Query 1820 response management process costs.

When determining CRAV Ad prices, the following may also be considered: the promotion costs, the simultaneous broadcast venues used, the number and type of immersion rewards, the number of questions in the Query 1820 (i.e., immersion verification question, polling question, trivia-based questions of varied difficulties to reduce the number of fully correct responses), on-air versus off-air immersion verification responses, registration requirements, Query 1820 response gathering methodology, and winner selection and prize awarding responsibility. The Promoters must also determine if the Consumers 110 will be required to answer one or more special Advertiser-designed questions during the immersion verification process. This market data may be very valuable to the Advertisers, and may further substantiate the fee being charged by the Promoters. The Promoters may also elect to add one or more special public opinion questions to the Query 1820. This data may be related to the Promoters' other programs, may determine the Consumers' 110 interest levels to certain programming types, or may address any other marketing related issues. These public opinion questions may also be conducted as a service to public opinion agencies, which may pay the Promoters for providing the public opinion response results.

CRAV Ad is Presented to Consumers

Figure 4:
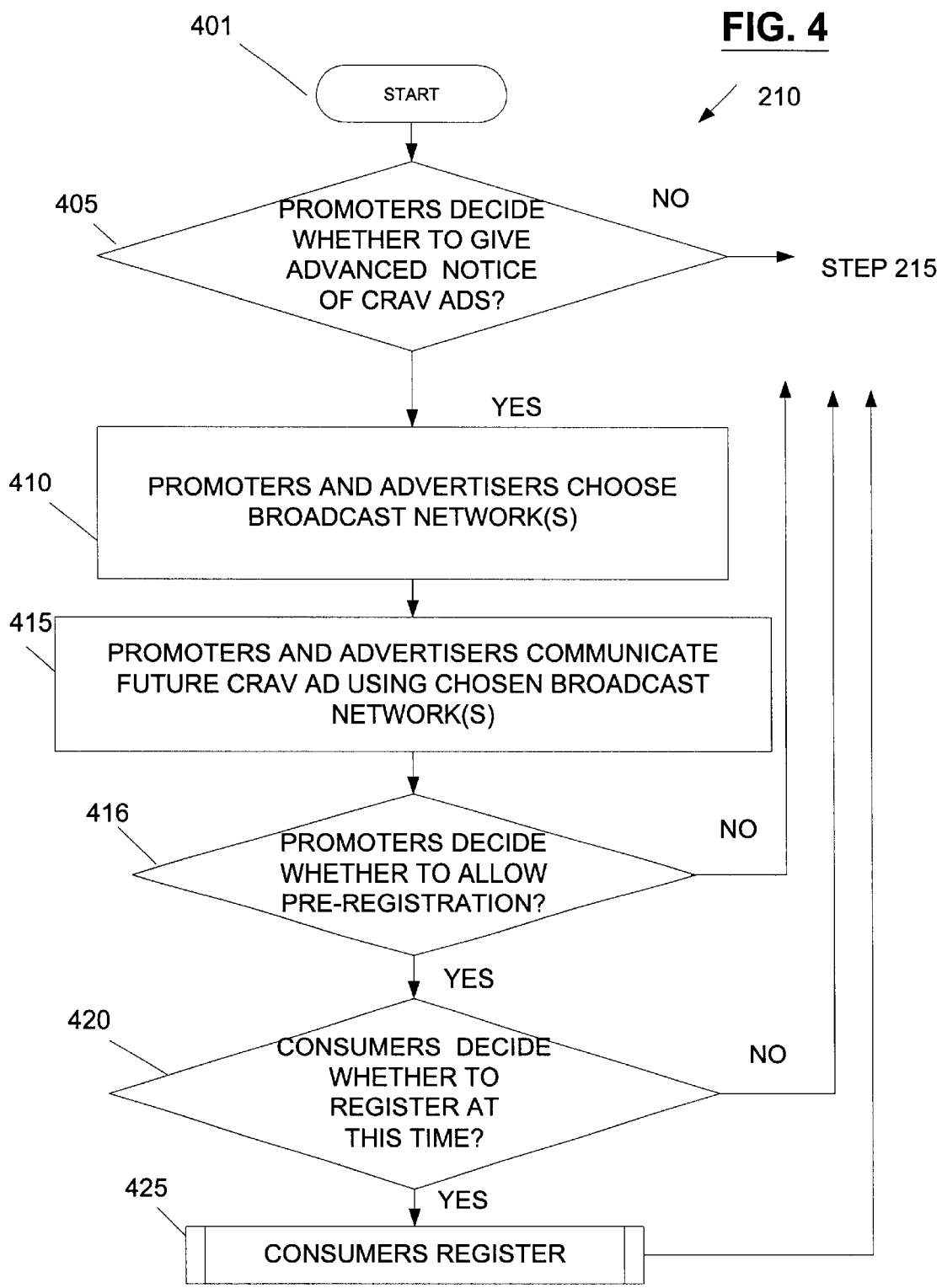
FIG. 4 is a flow diagram illustrating an exemplary process describing how the Promoters and the Advertisers use the Broadcast Network to promote future CRAV Ads.

FIG. 4 is a flow diagram illustrating an exemplary process describing how the Promoters and the Advertisers use the Broadcast Network 105 to promote future CRAV Ads, as set forth in step 210 of FIG. 2. The public is preferably notified about the broadcast of the CRAV Ad to maximize the program's audience size. Prior to the communication including the CRAV Ad, the Promoters provide advance warning to the Consumers 110 who may receive programs where the CRAV Ads will be communicated. This advanced warning may include educational, general public information informing the Consumers 110 about the CRAV Ads, and how successful immersion may result in the Consumers 110 receiving substantial rewards. These advance warnings may also include specific prize information, reveal the name and/or logo, and invite registration by the Consumers 110 prior to the broadcast. The Promoters and the Advertisers may provide this advanced notice.

Turning now to FIG. 4, an exemplary CRAV Ad process 210 is initiated at the "START" step 401. In step 405, the Promoters determine whether or not to give advanced notice of the future CRAV Ad broadcast. If the answer is "NO", then the process moves to step 215 of FIG. 2. If the answer is "YES", the process moves to step 410, where the Promoters and the Advertisers choose the Broadcast Network 105 for the advanced notice. The Broadcast Network 105 that can be used for the advanced notice includes the Broadcast TV Network 120, the Private Network 125, the Cable Network 135, the Internet 130, the Satellite Network 140, or any Other System 141. In step 415, the Promoters and the Advertisers communicate the availability of future CRAV Ads to the Consumers 110 using the chosen Broadcast Network(s) 105. In step 416, the promoter decides whether to allow the Consumers 110 to pre-register. If the answer is "NO", then the process moves to step 215 of FIG. 2. If the answer is "YES", the process moves to step 420.

In step 420, the Consumers 110 decide whether or not to register to respond to the CRAV Ads using the Device 111. If the answer to step 420 is "NO", the process moves to step 215 of FIG. 2. In one alternative exemplary embodiment, the CRAV Ad system is simple, and registration is not required. However, in alternative exemplary embodiments, registration is required during the process. Registration is preferred because this allows the Promoters and the Advertisers to collect detailed information about the Consumers 110. If the answer to step 420 is "YES", the Consumers 110 register, as set forth in step 425. The process then moves to step 215 of FIG. 2.

Figure 5:
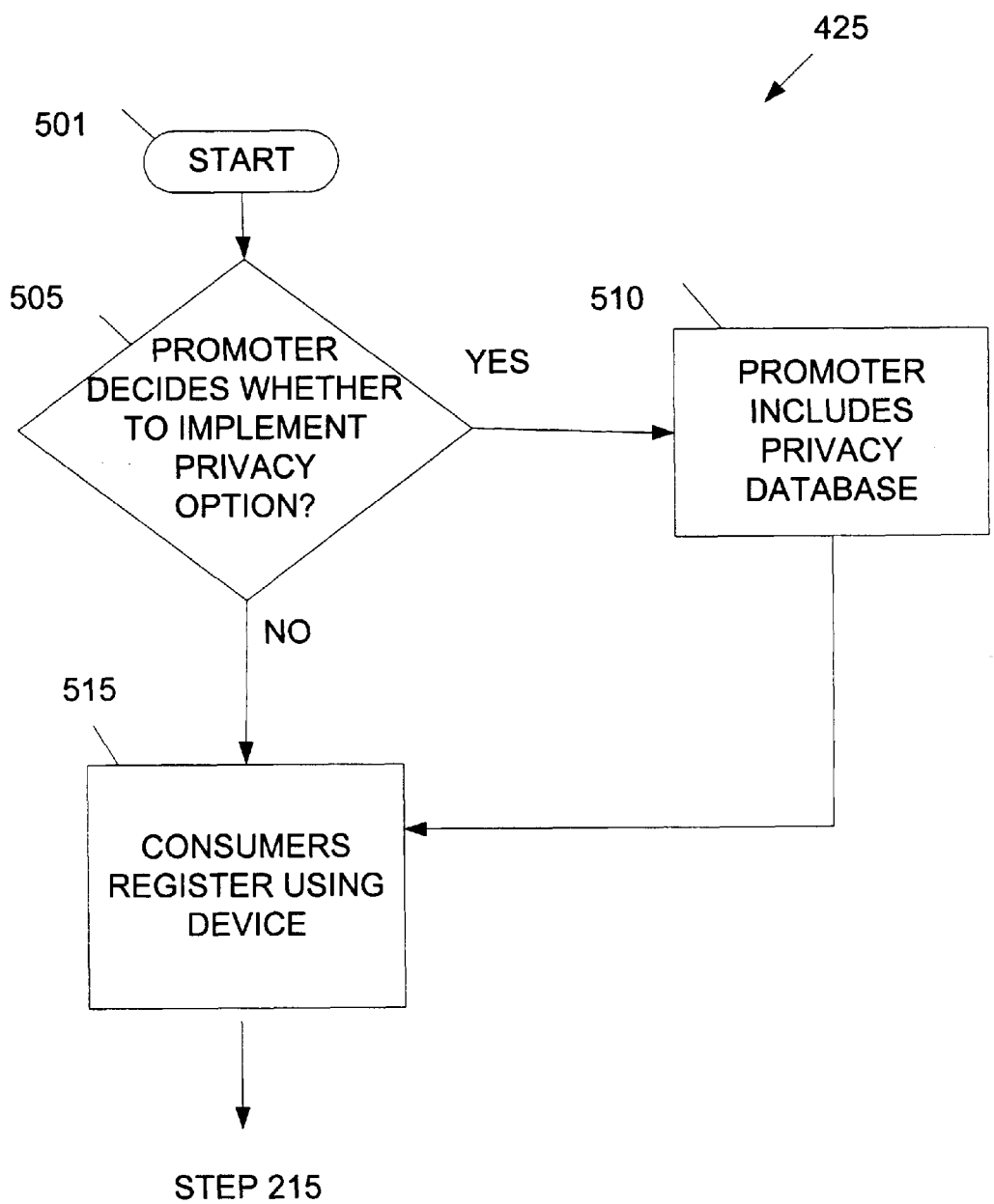
FIG. 5 is a flow diagram illustrating an exemplary process describing how the privacy option applies to the invention.

FIG. 5 is a flow diagram illustrating an exemplary process describing how the privacy option applies to the registration process, as set forth in step 425 of FIG. 4. Turning now to FIG. 5, an exemplary CRAV Ad process 425 is initiated at the "START" step 501. In step 505, the Promoters decide whether to implement the privacy option. The privacy option segregates confidential personal data from demographic data. If the privacy option is used, the Data Storage Center 195 includes the Privacy Database 199, as set forth in step 510. The process then moves to step 515. If the privacy option is not implemented, the process moves directly from step 505 to step 515. In step 515, the Consumers 110 register using the Device 111, and the process moves to step 215 of FIG. 2.

The privacy option is important because it allows the Consumers 110 to be less concerned that their personal registration information will be matched with their demographic and response information by outside parties.

Registration

Because the Query 1820 may be short in duration, the Consumers 110 may not be able to fully register and respond to the CRAV Ad within the allocated CRAV Ad time. Therefore, the Consumers 110 will usually want to register before the CRAV Ad is broadcast. Several registration options are available.

Registration information may include a variety of data. In one exemplary embodiment, the Promoters do not want to use demographic information and simply seek to identify the Consumers 110 for tracking and prize awarding purposes. The Consumers 110 are thus asked to provide simple information where they may be reached and identified if selected as a winner. This information may include a phone number, a social security number (or portion thereof), a birthday, a name, and an address. After providing the registration information, the Consumers 110 are provided with a unique "CRAV ID". This number may be a randomly generated unique number, or an easily remembered number or a series of numbers (such as a birthday and phone number combination), which may also provide ID information within the number.

In another exemplary embodiment for registration, the Promoters may wish to obtain ID information, product-related information, or public opinion-related information. The demographic profile of each Consumer 110 may include age, sex, race, weight, height, zip code, physical home or e-mail address, occupation, individual annual earning, educational background, political affiliation, religious affiliation, family size, number of TVs and computers, Advertiser-related or public opinion survey questions, and prior CRAV Ad answers (historical response information). A detailed registration may be required for each CRAV Ad. However, gathering this information for each CRAV Ad makes the registration process time-consuming, costly, and redundant, and may deter the Consumers 110 from submitting a response. Thus, a one-time registration process is also available. In this mode, only changed/updated demographic or ID information (such as a change in marital status, phone number, etc.) is added for each CRAV Ad response after the original registration. Under this scenario, the original registration information is stored in the PDC 197. As new responses or update information are transmitted to the Data Storage Center 195, the Data Storage Center 195 is updated.

In another alternative embodiment for registration, when only one registration is used (as described above), the Advertisers may have the Consumers 110 with existing CRAV IDs enter additional demographic information to be qualified for the rewards. In this case, new "response"

information is added for each additional CRAV Ad response after the original registration. Under this scenario, the original registration information would be stored in the DCS 196, and as new responses are transmitted to the Data Storage Center 195, the Data Storage Center 195 would be added to the registration information. The CRAV ID would be required before allowing additions to CRAV Ad records.

Broadcast CRAV Ad and Interaction with Consumers

Figure 6:
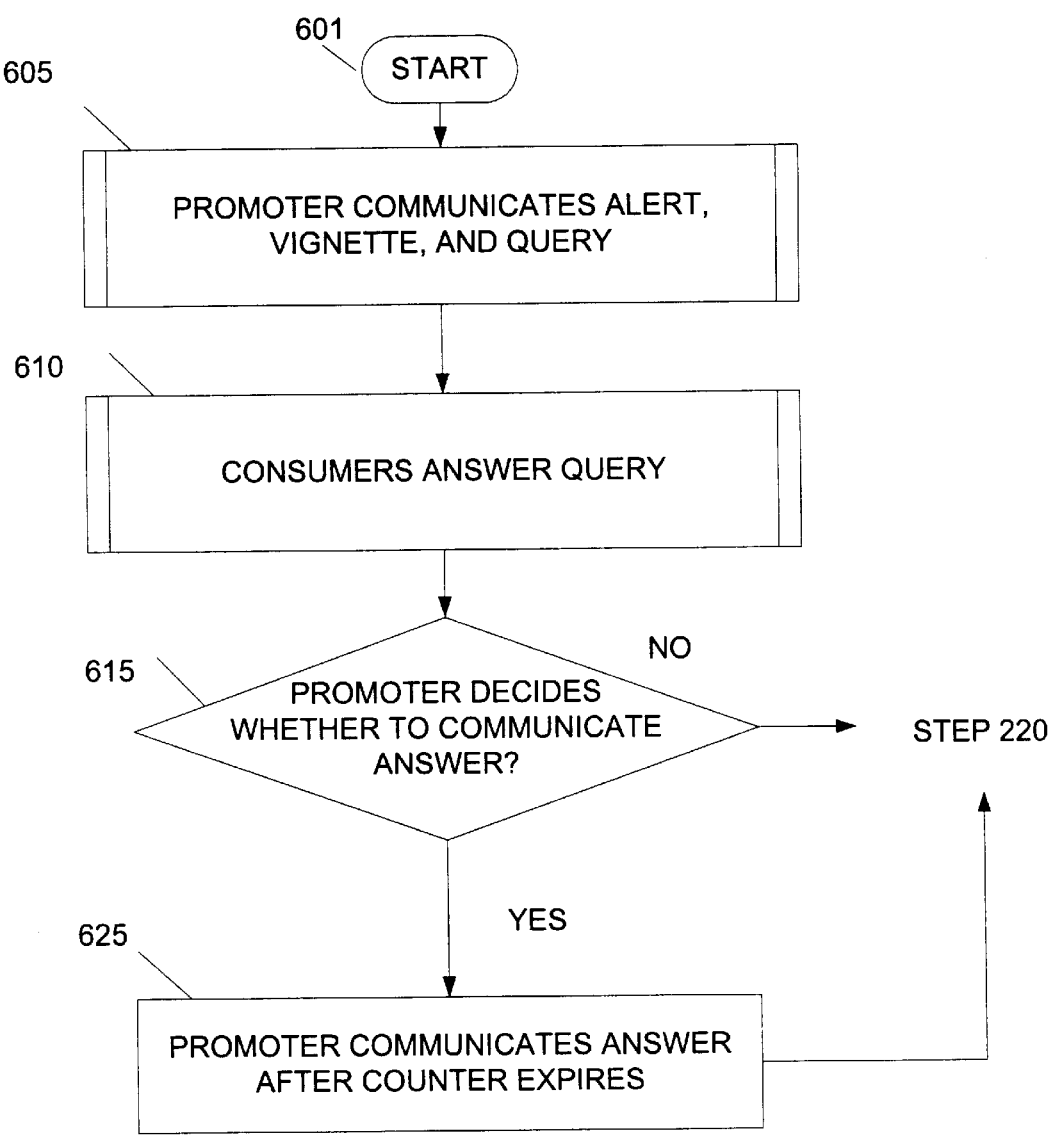
FIG. 6 is a flow diagram illustrating an exemplary process describing how the Promoters use the Broadcast Network, the Device, the Information Gathering System, and the Data Storage Center to communicate the CRAV Ads to the Consumers and to interact with the Consumers.

FIG. 6 is a flow diagram illustrating an exemplary process describing how the Promoters use the Broadcast Network 105, the Device 111, the Information Gathering System 112, and the Data Storage Center 195 to communicate the CRAV Ads to the Consumers 110 and to interact with the Consumers 110, as set forth in step 215 of FIG. 2. Turning now to FIG. 6, an exemplary CRAV Ad process 215 is initiated at the "START" step 601. In step 605, the Promoter communicates the Alert 1805, the Vignette 1810, and the Query 1820 using the Broadcast Network 105. The Alert 1805 is a warning to the Consumers that the upcoming Vignette 1810 should be memorized so the Consumers may become eligible to win a reward. The Vignette 1810 may be a conventional commercial for a product or service or any other information designed for presentation to a consuming audience. The Query 1820 includes one or more questions. In step 610, the Consumers 110 answer the Query 1820. In step 615, the option to communicate the Answer 1830 is provided, based on whether or not the Promoters wish to use this option. The Answer 1830 includes the answer to at least one of the Query's 1820 question or questions. If the answer to step 615 is "NO", and the Answer 1830 is not communicated, the process moves to step 220 of FIG. 2. If the answer to step 615 is "YES", the Promoter communicates the Answer 1830 after the counter time has expired using the Broadcast Network 105, as set forth in step 620. The process then moves to step 220 of FIG. 2.

Figure 7:
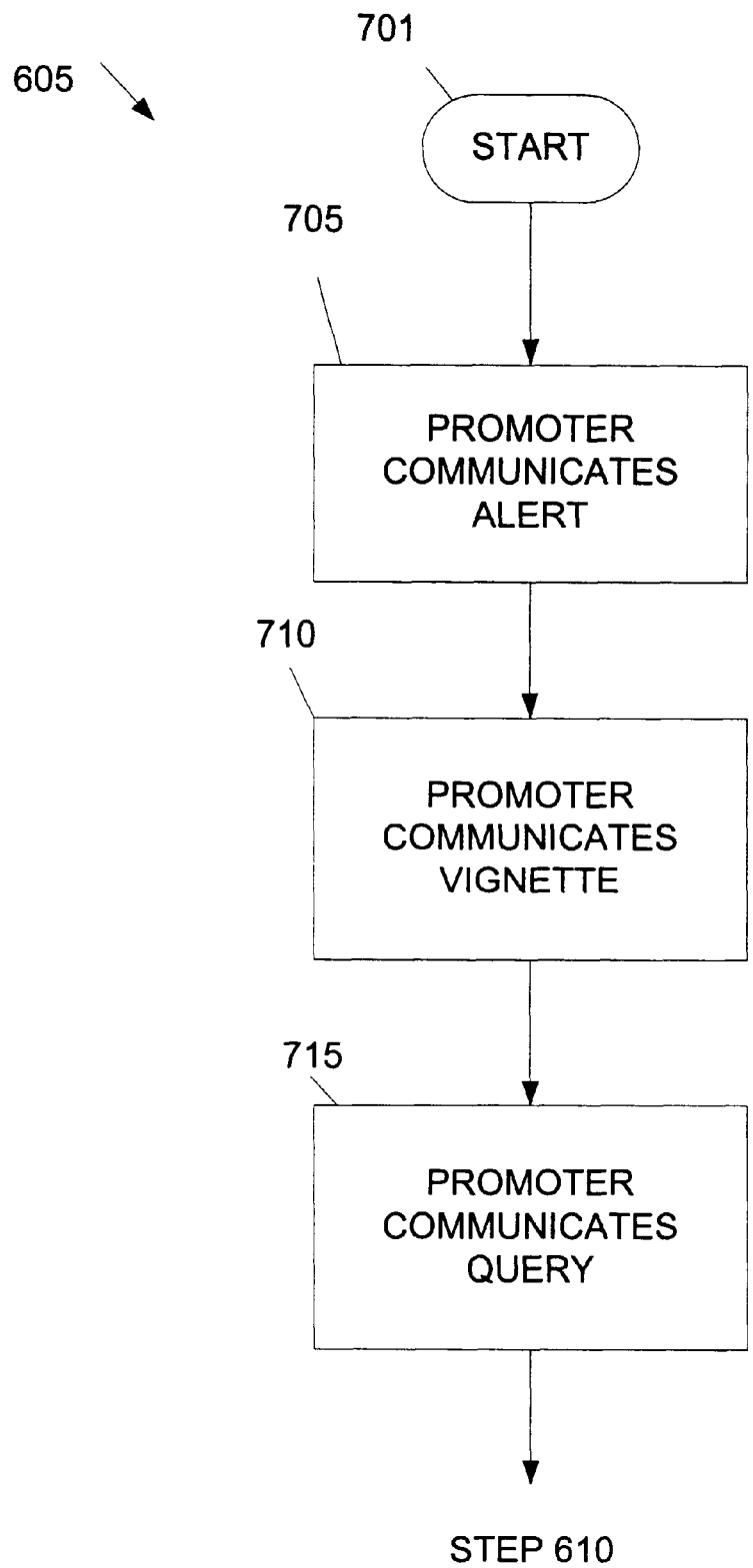
FIG. 7 is a flow diagram illustrating an exemplary process describing how the Promoter communicates the Alert, the Vignette, and the Query using the Broadcast Network.

FIG. 7 is a flow diagram illustrating an exemplary process describing how the Promoter communicates the Alert 1805, the Vignette 1810, and the Query 1820 using the Broadcast Network 105, as set forth in step 605 of FIG. 6. Turning now to FIG. 7, an exemplary CRAV Ad process 605 is initiated at the "START" step 701. In step 705, the Promoter communicates the Alert 1805 using the Broadcast Network 105. The Alert 1805 may include a prize description and an Advertiser and/or Promoter logo. The Alert 1805 may also include any other information the Promoters, or some other entity, wishes to display. In step 710, the Promoter communicates the Vignette 1810 using the Broadcast Network 105. The Vignette 1810 may include an Ad and the Advertiser and/or Promoter logo. The Vignette 1810 may also include any other information the Promoters, or some other entity, wishes to display. In step 715, the Promoter communicates the Query 1820 using the Broadcast Network 105. The Query 1820 may include questions, possible answers, login response information, a time remaining counter, and the Advertiser and/or Promoter logo. The CRAV Ad Query 1820 may also include any other information the Promoters wishes to include. The process then moves to step 610 of FIG. 6.

CRAV Ad Is Answered

Figure 8:
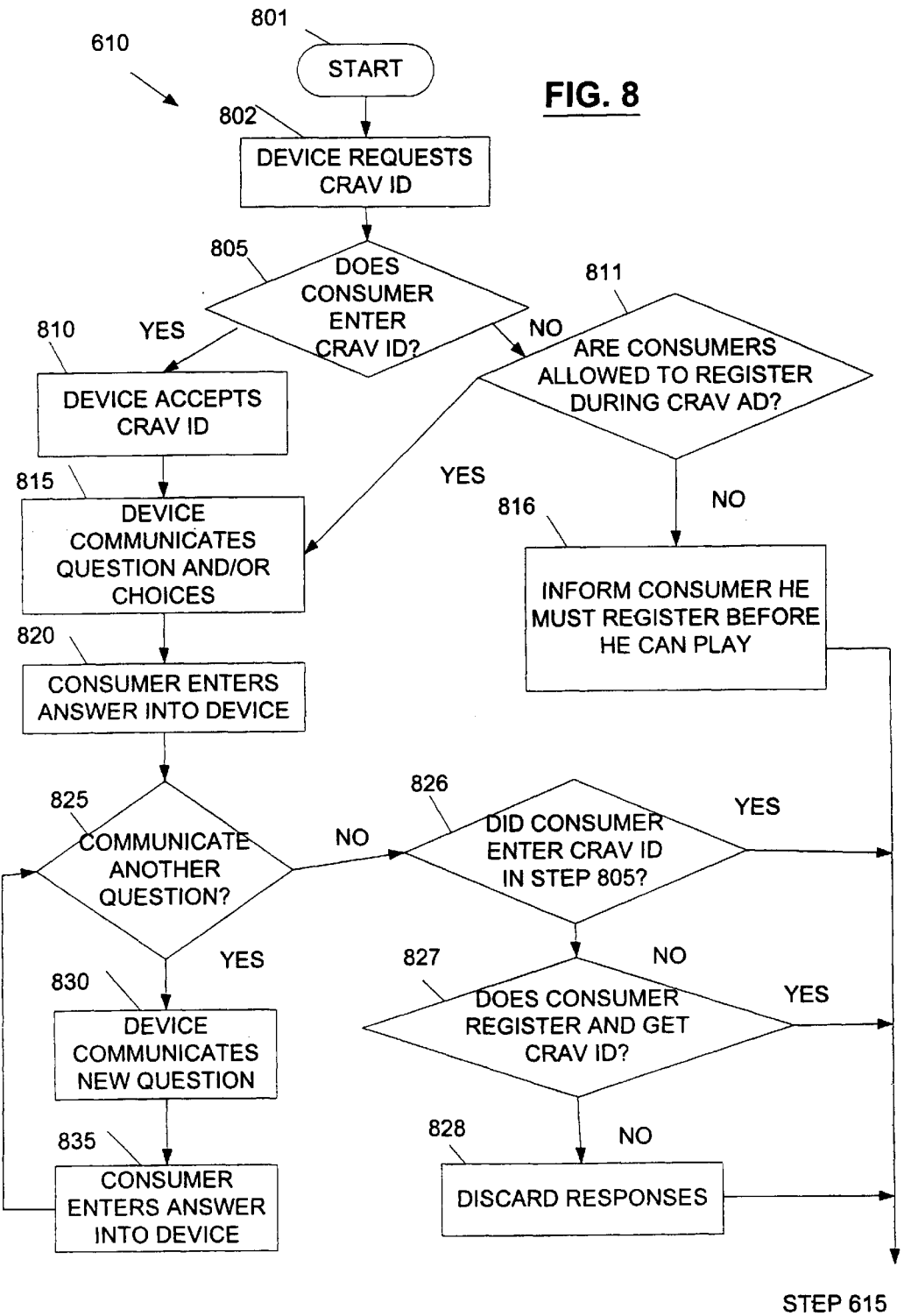
FIG. 8 is a flow diagram illustrating an exemplary process describing how the Consumers answer the CRAV Ads.

FIG. 8 is a flow diagram illustrating an exemplary process describing how the Consumers 110 answer the CRAV Ads, as set forth in step 610 of FIG. 6. Turning now to FIG. 8, an exemplary CRAV Ad process 610 is initiated at the "START" step 801. In step 802, the Device 111 prompts the Consumers 110 to enter their CRAV ID. In step 805, it is determined whether or not Consumers 110 have entered a CRAV ID. If the answer to step 805 is "NO" and the Consumers 110 do not enter a CRAV ID, registration may be allowed, as set forth in step 811. If registration is allowed, the process moves to step 815. If registration is not allowed, the Consumers 110 are informed that they must register before they can submit a response to the CRAV Ad, as set forth in step 816. The process then moves to step 615 of FIG. 6.

If the answer to step 805 is "YES", and the Consumers 110 have entered a CRAV ID using the Device 111, the Device 111 accepts the CRAV ID as set forth in step 810. The CRAV ID may be a number assigned by the Promoter or the Advertiser. It may be stored in memory to eliminate the need for manual entry. Examples of how to store the CRAV ID into memory include using a cookie over the Internet, or entering a stored number into a phone (speed dial memory function). In step 815, the Broadcast Network 105 or Device 111 communicates the first question of the CRAV Ad Query 1820 and the answer choices. The question can be an immersion verification question, a polling question, a trivia question, or any other type of question. The answer choices may be a set of predetermined response options a, b, c, d, etc., or the Consumers 110 may be required to enter the answer itself. The options for answering may include the broadcast of unique numbers or letters that may differ between broadcasters, that allow subsequent decoding by the Data Storage Center 195 to determine the broadcast medium or location used by the Consumers 110 to view the CRAV Ad. In step 820, the Consumers 110 enter their answer into the Device 111. In step 825, the Promoters may communicate another question as part of the same Query 1820 using the Broadcast Network 105 or Device 111. This question may be another immersion verification question, or a question used to get information about the Consumers 110. This information may include demographic information or other information. If the Promoter chooses "YES" to decision step 825, the process moves to step 830, and the Device 111 communicates the new question. In step 835, the Consumer enters the answer into the Device 111. The process then moves back to step 825 and is repeated. If the answer to step 825 is "NO", and no other questions will be asked, the process moves to step 826. In step 826, it is determined whether or not the Consumer 110 entered a CRAV ID in step 805. If the answer to step 826 is "YES", the process moves to step 615 of FIG. 6. If the answer to step 826 is "NO", the process moves to step 827, where Consumers 110 have the option to register. If the answer to step 827 is "YES", and the Consumers 110 register, the process moves to step 615 of FIG. 6. If the answer is "NO", and the Consumers 110 don't register, or don't completely register, the process moves to step 828 and the responses are discarded. The process then moves to step 615 of FIG. 6.

CRAV Ad Answers are Gathered

Figure 9A:
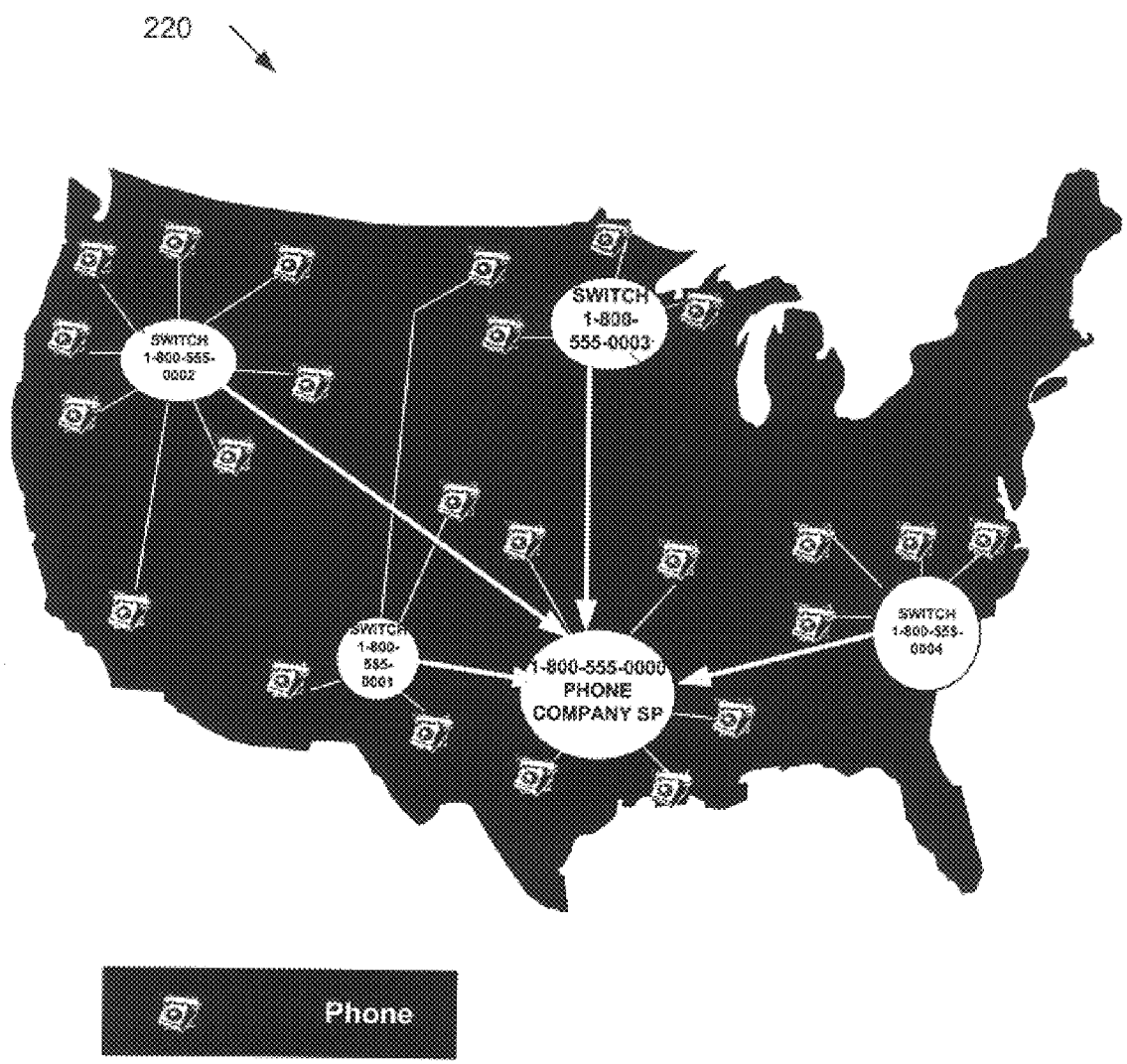
FIGS. 9A and 9B, together comprising
Figure 9B:
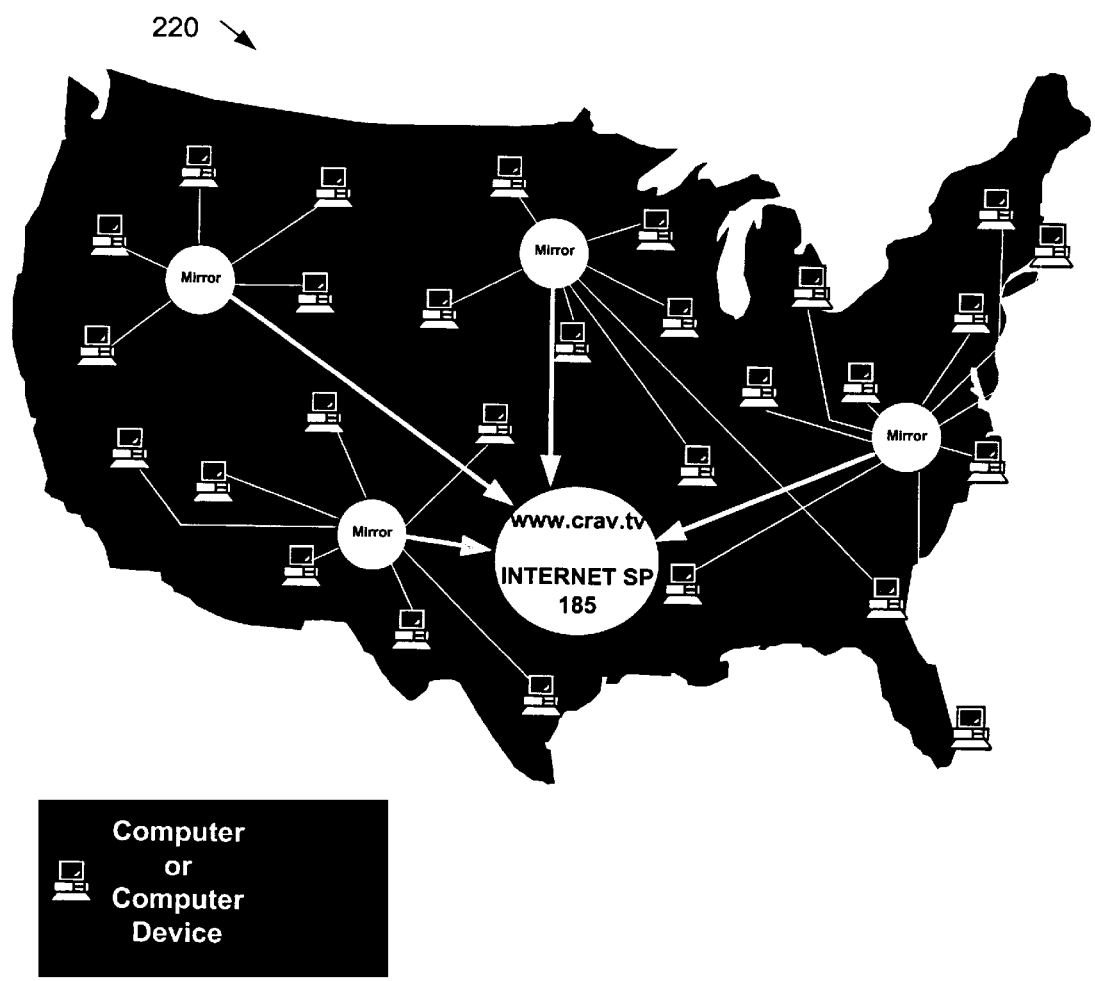

FIGS. 9A and 9B, together comprising FIG. 9, are picture diagrams illustrating an exemplary nationwide network for gathering the registration and response information, as set forth in step 220 of FIG. 2. The Query 1820 gathering network is designed to accommodate two variables in any data collection activity. First, expected traffic and geographic/time zone requirements must be met. Second, the registration and the response information must be sent to the Data Storage Center 195. FIG. 9A illustrates the United States map, and shows how conventional Phones 145 forward the registration and the response information to the Phone Company SP 170. FIG. 9B illustrates the United States map, and shows how the Internet computer 130 forwards the registration and the response information to the Internet SP 185. Although the Figures illustrate the United States, one experienced in the art will recognize that the collection system may be implemented in any country, or in multiple countries.

Turning now to FIG. 9A, a network is illustrated showing how Consumer responses are forwarded by the Phone 145 to the Phone Company SP 170. Those experienced in the art will recognize the multiple ways to meet expected traffic and geographic/time zone requirements. Similar to traffic terminology, the traveling information is called "traffic", the length between two points is "distance", and impeded traffic is "congestion." In an exemplary embodiment, a single Web site and a single phone number would be sufficient to handle Query 1820 responses. However, in most cases, multiple lines are necessary to handle the numerous response traffic.

For telecommunication lines, design elements may assist in reducing distance and avoiding congestion. For example, multiple phone numbers (connected to one or multiple Information Gathering Systems 112) may be located in geographically centered locations. In addition, one published phone number, which incorporates a switch directing incoming calls to one or multiple Information Gathering Systems 112, may be located in geographically centered locations, directed based on the incoming call's origin point. FIG. 9A illustrates the option of the Phones 145 forwarding the registration and the response information to the Phone Company SP 170.

For responses provided over a network such as the Internet Network 130, the following design elements may assist to reduce distance and avoid congestion: mirrored Web sites with unique Web site addresses (each serving as a Information Gathering System 112) located in geographically centered locations; one published Web site address, which is redirected to one or more mirrored Web sites ideally located in geographically centered locations near the user's SP 112; and unique Web sites hosted by individual Internet SPs 185 or approved Information Gathering Systems 112. FIG. 9B illustrates the option of the Internet computer 160 forwarding the registration and the response information to the Internet SP 185.

Figure 10:
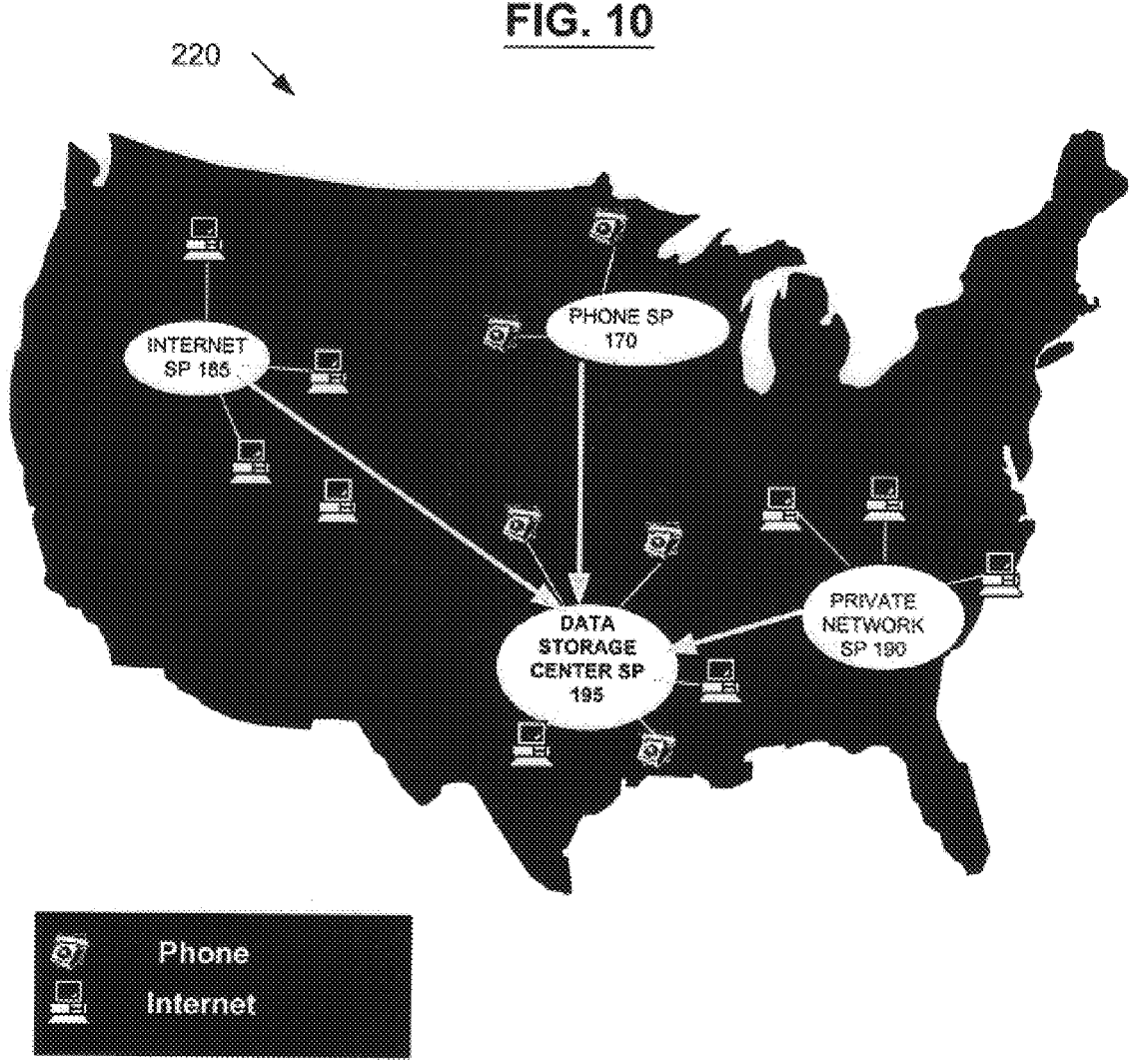
FIG. 10 is a picture diagram illustrating how the Information Gathering System sends the registration and the response information to the Data Storage Center in an exemplary embodiment.

FIG. 10 shows how the Information Gathering System 112 sends the registration and the response information to the Data Storage Center 195. The registration and the response information is sent to the Information Gathering Systems 112 that may be hosted by a SP network. A CRAV Web site may also be set up to be the Information Gathering System 112. This CRAV Web site may be housed at the same location as the Data Storage Center 195. Once the CRAV Ad has concluded, the Information Gathering System 112 forwards the registration and the response information to the Data Storage Center 195 on a time scheduled, synchronized basis. Once the Consumers' 110 data is received and verified by the Data Storage Center 195, the response information may be programmed for automatic erasure by the Information Gathering System 112. FIG. 10 illustrates three Information Gathering Systems 112 for forwarding registration and response information: an Internet SP 185, a Phone Company SP 170, and a private network SP 190.

CRAV Ad Winners Selected and Prizes Distributed

Figure 11:
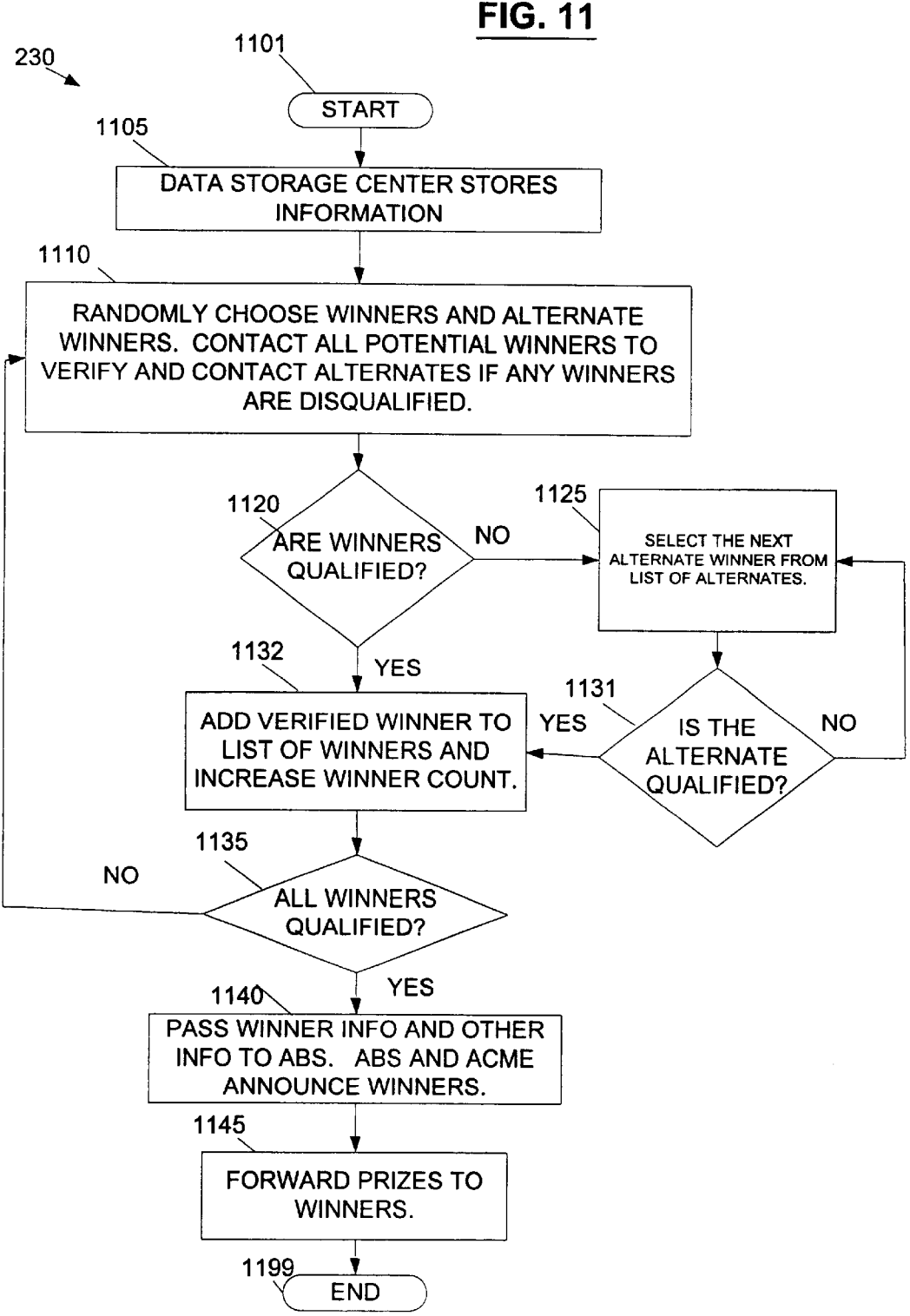
FIG. 11 is a flow diagram illustrating an exemplary process describing how the Promoters select winners and distribute prizes.

FIG. 11 is a flow diagram illustrating an exemplary process describing how the Promoters select winners and distribute prizes, as set forth in step 230 of FIG. 2. Turning now to FIG. 11, an exemplary CRAV Ad process 230 is initiated at the "START" step 1101. In step 1105, The Data Storage Center 195 stores the registration information in the PDC 197 and the response information in the DCS 196. In step 1110, the Promoters or a third party service provider randomly choose winners and alternate winners from the DCS 196 database. The DCS 196 database includes a list of the Consumers 110 who have correctly answered all required questions. The Promoters, the Advertisers, or a third party service provider, also contact the potential winners. (This third party service provider may also offer fulfillment services including information on Consumer answers and coupons.) Based upon the process selected by the Promoters or the Advertisers, the potential winner identities and the truthfulness of the potential winners' registration and response information may be verified. If this option is used, the Promoters verify the identity by authenticating the Consumers' registration and response information. The Promoters may require potential winners to verify demographic or confidential data prior to awarding the prize. The Promoters may repeat the one or more questions in the Query 1820. The Promoters may elect to disqualify potential winners who fail to provide responses that match their Query 1820 responses.

In step 1120, it is determined if the winners are qualified for the prizes. If the answer to step 1120 is "NO", the process moves to step 1125, and the next alternate winner is selected from the list of alternate winners. In step 1131, it is determined if the alternate winner is qualified. If the answer to step 1131 is "NO", the process moves back to step 1125 and is repeated. If the answer to step 1131 is "YES", the process then moves to step 1132.

If the answer to step 1120 is "YES", the process moves to step 1132, and the verified winner is added to the list of winners and the winner count is increased. In step 1135, it is determined if all winners are qualified. If the answer to step 1135 is "NO", the process moves to step 1110 and is repeated. If the answer to step 1135 is "YES", the process moves to step 1140. In step 1140, the winner information and other opted information (i.e., demographically pertinent data and Query 1820 response results) may be forwarded to Advertisers and/or other interested entities, particularly if Consumers 110 have approved the forwarding of said information. The Promoters, the Advertisers, or a third party service provider also announce the winners. In step 1145, the Promoters, the Advertisers, or third party service provider forwards the prizes to the winners. The process then ends at step 1199.

Other Applications for CRAV Ads

While the above description is ideally suited for visual mass media technology such as the TV and the Internet 130, it may also be utilized in alternate mass media channels, using audio-only technology like radio, or visual-only broadcast mediums, such as a magazine or newspaper ad. The CRAV Ads may be answered with complicated, highly-developed computer Devices 111, or simply by using the Phone 145. Those practiced in the art will recognize the above invention may be implemented with any broadcast medium and response medium. In addition, the invention is not limited to providing ads within entertainment content, but can be extended to providing other types of information. Finally, while the invention has been discussed in the context of the Consumers 110, the Promoters, and the Advertisers, those experienced in the art will recognize that other entities can be used. For example, a third party service provider can be responsible for: gathering the registration and response information, screening the registration and response information to validate it, mining the registration and response information to extract pertinent data, randomly selecting the winners and alternate winners, and providing prize fulfillment and delivery verification services.

EXAMPLE

To better illustrate the CRAV Ad process, a representative example is provided. The Promoter is ABS Broadcasting Company ("ABS") and the Advertiser is ACME Motors ("ACME"). The Consumers 110 are a four person family in Largo, Fla. Mr. Daly is 60 years old and Mrs. Daly is 58. Two sons live at home. Mike is 25, Mark is 23.

Figure 12:
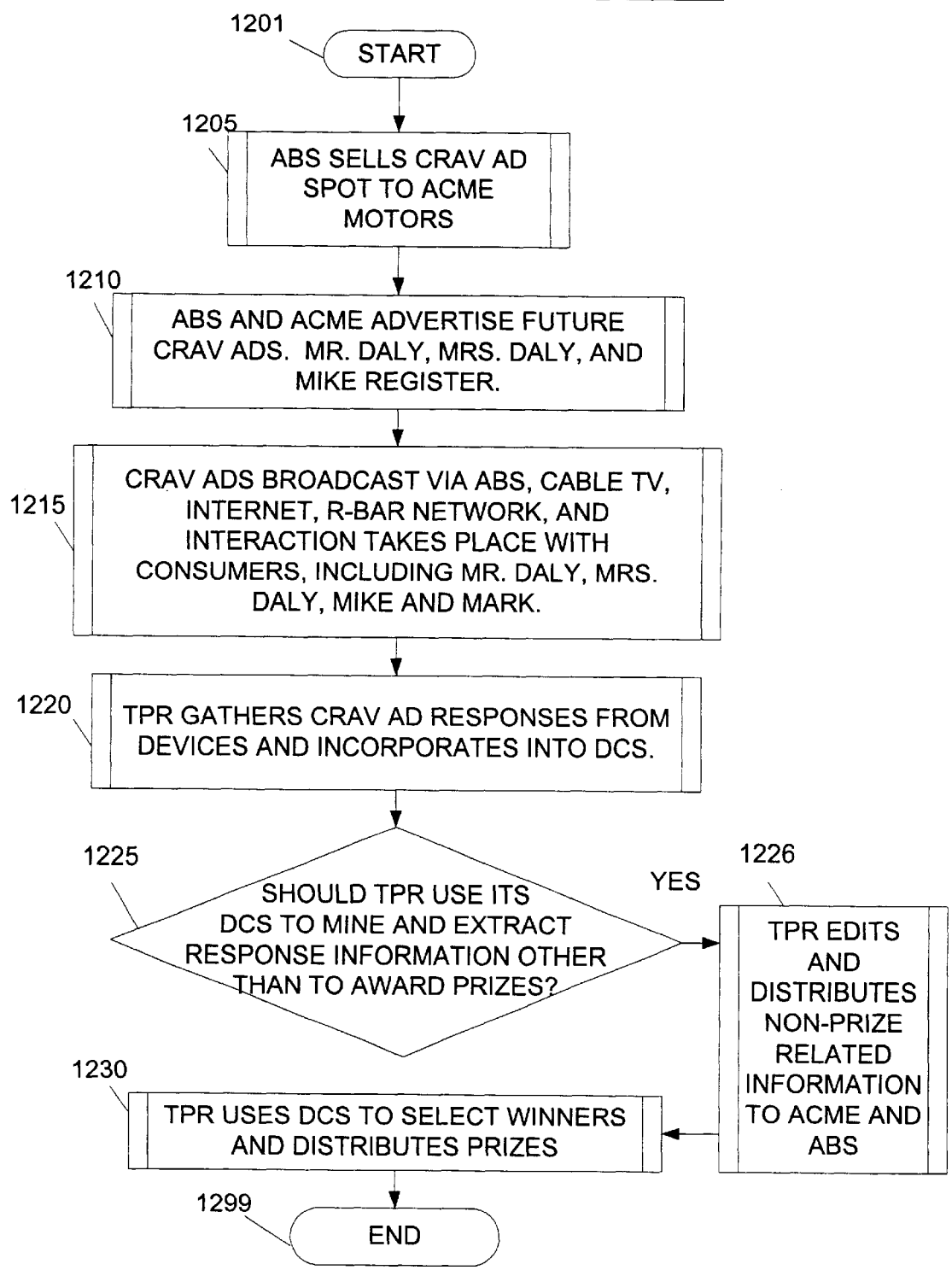
FIG. 12 is a flow diagram illustrating an exemplary process describing an overview of a CRAV Ad process.

FIG. 12 is a flow diagram illustrating a CRAV Ad example. An exemplary process is initiated in step 1201. In step 1205, ABS sells two two-minute CRAV Ad slots to ACME Motors ("ACME"). In step 1210, ABS and ACME advertise the future broadcast of CRAV Ads, and as a result, the Dalys register. In step 1215, the CRAV Ads are broadcast. In step 1220, the CRAV AD responses are gathered. In step 1225, the DCS is utilized to use the gathered information for purposes other than awarding prizes. In step 1226, the DCS mines, extracts, edits and forwards the non-prize winner related information. In step 1230, the DCS is utilized to select the winners and distributes the prizes.

Figure 13:
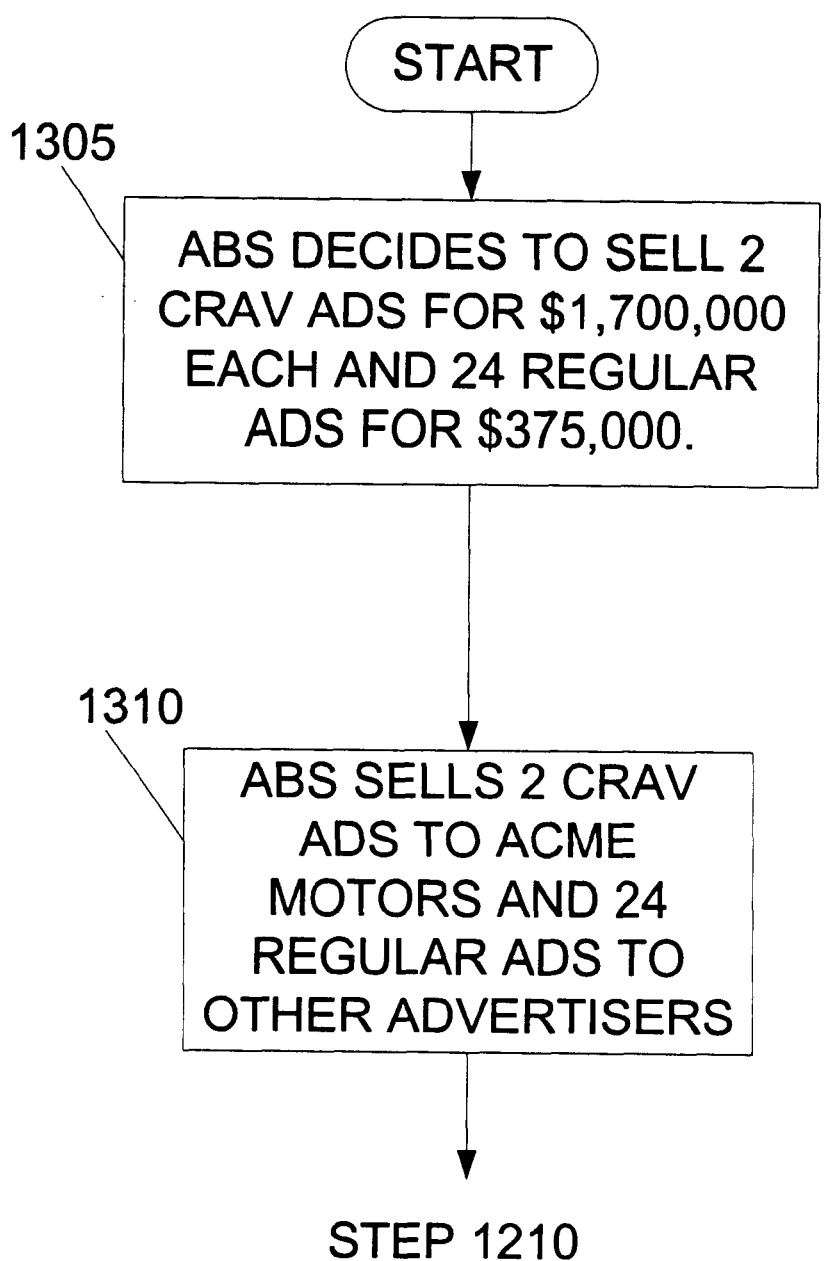
FIG. 13 is a flow diagram illustrating an exemplary process describing how the ad slots are sold.

FIG. 13 is a flow diagram illustrating how the Ad slots are sold, as set forth in step 1205 of FIG. 12. Turning now to FIG. 13, ABS decides to sell the two CRAV Ads for $1,700,000 each and the twenty-four regular ads for $375,000 each, as set forth in step 1305. ABS sells the two CRAV Ads to ACME, and the twenty-four regular ads to other Advertisers, as set forth in step 1310. The process then moves to step 1210 of FIG. 12.

To determine the ad price, ABS follows the chart set forth in FIG. 14. ABS determines the average profit for a show "Lawyers in Love". "Lawyers in Love" is shown at 8 PM EST/8 PM MST (broadcast over delayed time slots) and has a length of 60 minutes. The show's average viewing audience is 7 million Consumers 110. ABS has allocated 16 advertising minutes (32 30-second spots) for the show. ABS charges $300,000 per 30-second spot to Advertisers, earning $9.6 million revenue per show. The show expenses are $8,000,000. Thus, the average profit is show revenue ($9.6 million)–show expenses ($8 million)=net profit ($1.6 million). The average cost to the Advertiser per 1000 Consumers 110 is $42.86, without taking the CRAV Ads into account.

ABS then determines the substitution analysis. The two CRAV Ads priced at $1,700,000 replace (8) 30-second ad slots, for which ABS had formerly garnered $2.4 million in revenue. ABS also wishes to allocate $1 million for prizes, bringing the CRAV Ad price to $3.4 million. The CRAV data gathering cost is $510,000. ABS pays this fee to TPR, a third party information warehousing and collection organization equipped with CRAV related registration and Information Gathering System 112. TPR will also select winners and alternates, authenticate winner responses, provide a list to ABS and ACME, and will handle the prize distribution process. ABS spends $400,000 promoting the future CRAV Ads.

ABS estimates the CRAV Ad contest will increase the audience by 30%. ABS therefore increases the traditional ad price by 25%. The new ad price is $375,000 for each 30-second slot. The Advertisers are therefore paying $375,000 per 30-second regular ad (as opposed to $300,000), but are in exchange potentially achieving higher immersion levels, and their regular ads are being broadcast to a larger audience at a lower cost per impression. The new cost per 1000 Consumers 110 is lower: $42.21.

This $75,000 increase per slot, over 24 slots, adds $1.8 million in additional revenues to ABS. This is offset by the $400,000 additional cost to promote the upcoming CRAV Ads, plus $510,000 for CRAV information collection, compilation and winner selection/verification. Thus, ABS realizes $890,000 in additional net profit. This increases the show's profitability by over 55%.

FIG. 15 is a picture flow diagram illustrating an exemplary CRAV Ad process for ABS and ACME to promote future CRAV Ads, as set forth in step 1210 of FIG. 12. In step 1501, the process 1210 is initiated at the "START" button 1501. In step 1505, ABS and ACME elect to promote and give advanced notice of the CRAV Ads. In step 1510, ABS chooses to promote the CRAV Ads on TV, the Internet 130, email, and TV guide, and ACME chooses to promote the CRAV Ads on the Internet 130, email, and cable TV. As set forth in step 1515, during the weeks before the broadcast, ABS promotes the upcoming "CRAV/ACME New Car Giveaway" promotion on its own ABS network. ABS also purchases TV guide magazine ads, posts information on the ABS Web site, and sends out information to its email lists. Also promoting the CRAV Ads are ACME's own banners on its Web site and email notification to its 3.5 million subscribers. ACME also advertises on the HiTechTV cable channel network. Mr. Daly sees the CRAV Ads promoted on ABS. Mrs. Daly sees the CRAV Ads promoted on ACME's Web site while surfing the Internet 130. Mike sees the CRAV Ads promoted on HiTechTV cable. Mark does not see the CRAV Ads promoted. The CRAV Ad promotion states: "Watch 'Lawyers in Love' on Sunday at 8:00 EST and you may win 1 of 50 new ACME convertibles. Register at www.crav.tv or by calling 1-800-CRAVNOW." All broadcast promotions for the future ACME CRAV Ads include this registration information. Registration is conducted by TPR.

Following step 1520, Mr. Daly and Mrs. Daly choose to register. Mike chooses not to register at this time. Mark does not know he may register, and therefore does not register. As set forth in step 1525, Mr. Daly registers using the Phone 145, and Mrs. Daly registers using the Internet computer 160. The process then moves forward to step 1215.

The registration process involves having Mr. Daly and Mrs. Daly enter registration information. FIG. 16 shows a sample CRAV record, which may include a name, Social Security number, phone number, PIN, birthday, email, address, and any wins. The Promoters may also ask the Consumers 110 to enter demographic information, which may include sex, zip code, number of children, marital status, race, weight, height, occupation, annual earnings, education, political affiliation, and religious affiliation. This information may be supplemented and updated with information including: the number of TVs and computers owned, the number of vehicles owned, and the favorite TV network. The historical response information provides information on the responses the Consumers 110 have given to prior CRAV Ads.

While the Consumers 110 may enter demographic information during the registration process, the Query 1820 also provides an opportunity to gather demographic information. This information may be added to the CRAV demographic information, or may be added to the historical response data. In this case, a Level II demographic record may be incorporated into the record, for easier search and compilation in the future. Level II demographic information is collected after the initial registration point and thus may contain information for some, but not all, Consumers 110. As a result, Level II demographic information may limit the total survey population, as opposed to the primary Level I demographic information, which is provided by all registrants at initial registration.

FIG. 17 is a flow chart illustrating an exemplary embodiment of step 1215, where ABS broadcasts the Alert 1805, the Vignette 1810, and the Query 1820. Turning now to FIG. 17, the process 1215 is initiated at the "START" step 1701. In step 1705, ACME elects to utilize the MultiSimulcast concept, by offering simultaneous ACME CRAV Ad broadcasts over multiple Devices. ACME chooses to show the ACME CRAV Ad on ABS, ACME's Web site, HiTechTV Cable, and the R-BAR Network simultaneously at 8:33 PM EST on Sunday. Therefore, identical ACME CRAV Ads are multisimulcast on these mediums at 8:33 PM EST. Mr. Daly sees the ACME CRAV Ad while watching "Lawyers in Love" on ABS 120. Mrs. Daly sees the ACME CRAV Ad while logged on to the Internet 130. (Mrs. Daly already provided her CRAV ID when she logged on.) Mike is watching HiTechTV Cable 135 in his room, and sees the ACME CRAV Ad. Mark sees the ACME CRAV Ad at a local bar, using the R-Bar Network 125. In step 1710, the Consumers 110 answer. Mr. Daly answers using the Phone 145. Mrs. Daly answers using the Internet computer 160. Mike answers using his Palm Pilot PDA 150, although Mike has not yet registered. Mark answers using the R-Bar Device 165. The Answer 1830 to the Query 1820 is shown only on ABS, as set forth in step 1715–1720. The Answer 1830 is not shown on the Internet 130, the HiTechTV Cable 135, and the R-Bar Network 125.

FIG. 18 illustrates the CRAV Ad the Consumers 110 see, as set forth in FIG. 17. In step 1805, the Alert 1805 is pictured. The Alert 1805 states: "Memorizing the following ACME CAR COMPANY CRAV Ad may make you a winner of 1 of 50 new ACME convertibles." This Alert 1805 is shown for 10 seconds. In step 1810, the Vignette 1810 is broadcast. The Vignette 1810 is a 60-second entertaining and informative ad suitable for broadcast in non-CRAV Ads as well. In step 1820, the Query 1820 is broadcast. The Query 1820 includes three questions: an immersion verification question 1820*a* broadcast over Broadcast Network 105, including ABS, ACME's web site, HiTechTV, and R-BAR private broadcast network; and an Advertiser question 1820*b*, and polling question 1820*c*, both of which are distributed via Devices 111, including a telephone network, ACME's Web Site, R-Bar private Network, and Palm Pilot PDA Network. The immersion verification question 1820*a* asks "What new ACME model features side impact air bags?" The multiple choice responses are displayed or vocalized: 1) SD2020, 2) XP2030, 3) XX2040, 4) XYZ123. The second question, the Advertiser question 1820*b*, is communicated. This is a question designed by the Advertiser, posed to the Consumers 110 while responding through the various Devices 111. This question asks "When do you plan on buying a new car?" The multiple choice responses are displayed or vocalized: 1) 2 years or over, 2) within 2 years, 3) within 1 year, 4) within 6 months. In step 1820*c*, the third question, the polling question 1820*c*, is displayed or vocalized. This question is designed for a contracted pollster, posed to the Consumers 110 while responding through the various Devices 111. This question asks "Assuming the following choices, for whom do you plan to vote for U.S. President in 2008?" The multiple choice responses are displayed or vocalized: 1) Hillary Clinton, 2) Colin Powell 3) Jeb Bush 4) Frank Maggio. In step 1830, the correct answer to question 1 is displayed or vocalized: XP2030.

Figure 19:
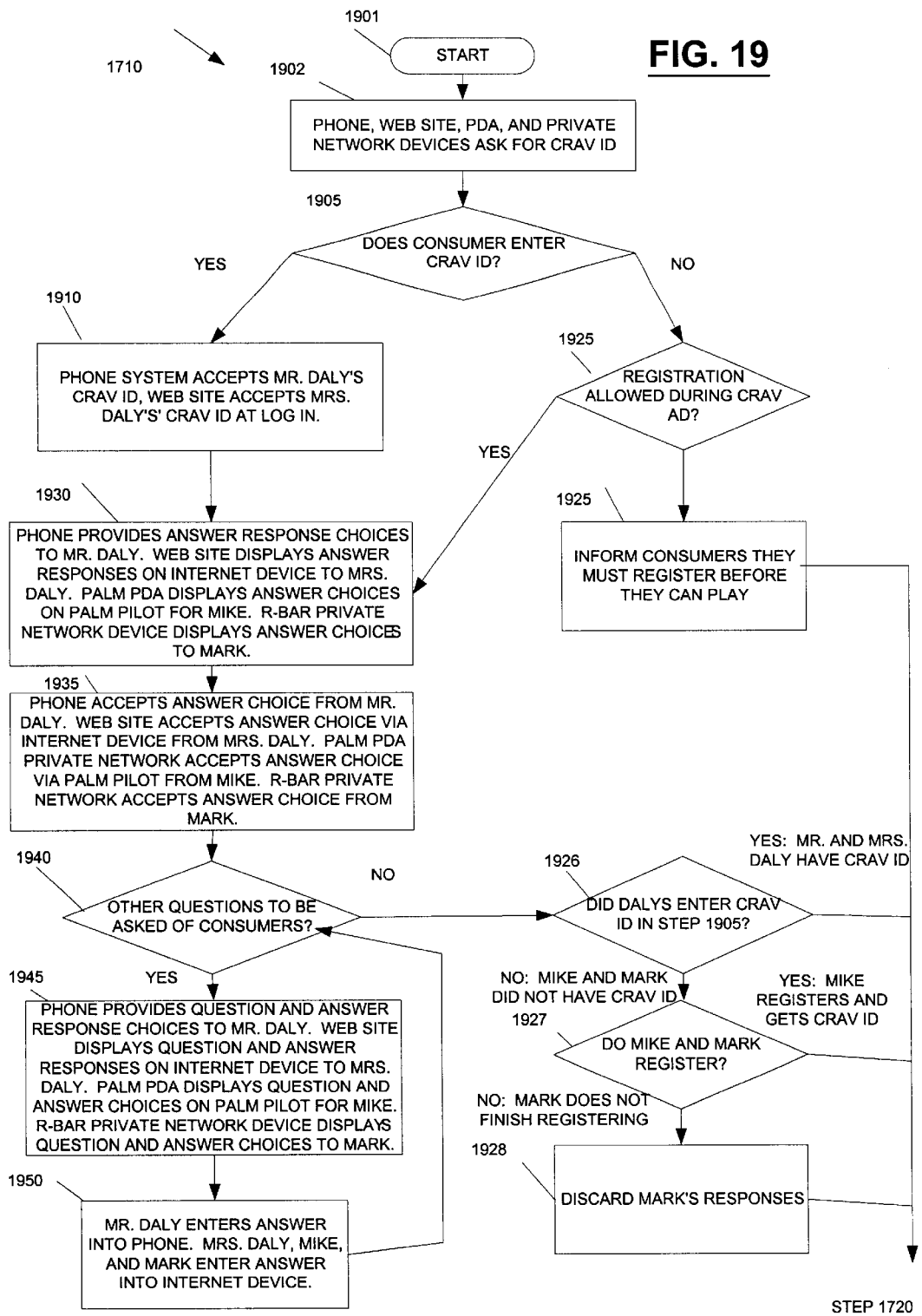
FIG. 19 is a flow diagram illustrating how the CRAV Ads are answered by the customers in an exemplary embodiment.

FIG. 19 is a flow diagram illustrating how the CRAV Ads are answered by the Dalys, as set forth in step 1710 of FIG. 17. For Mr. Daly, the process is as follows. Mr. Daly answers using the Phone 145, by dialing a phone number he was given when he registered. The phone number connects to an answering service, which asks Mr. Daly for his CRAV ID, as set forth in step 1902. Mr. Daly has already registered, so he enters his CRAV ID and it is accepted in step 1910. In step 1930, the Phone 145 plays Mr. Daly the first question 1820*a* with answer choices. In step 1935, he answers "SD2020" by pressing 1 on his touch-tone Phone 145, as prompted. (This is not the correct response.) Another question is asked, so the process moves from step 1940 to step 1945. In step 1945, Mr. Daly is asked the second question 1820*b* with answer choices. In step 1950, Mr. Daly answers "2 years and over" by pressing 1 on his Phone 145. A third question 1820*c* is asked, so the process moves from step 1940 to step 1945. In step 1945, Mr. Daly is asked the third question. In step 1950, Mr. Daly answers he will vote for "Frank Maggio" for President by pressing 4 on his Phone 145. (This is evidence of his political acumen.)

For Mrs. Daly, the process is as follows: Mrs. Daly answers using the Internet Computer 160. As Mrs. Daly already provided her CRAV ID automatically when she logged on (steps 1902–1910), she only needs to answer the questions. In step 1930, the Internet 130 shows the immersion verification question 1820*a*. In step 1935, Mrs. Daly selects "XP2030". In step 1945, the Internet Network 130 shows the Advertiser question 1820*b* with answer choices. In step 1950, Mrs. Daly selects "within 2 years". Because there is another question, the process moves from step 1940 to step 1945 again. In step 1945 the polling question 1820c with answer choices is shown. In step 1950, Mrs. Daly selects "Frank Maggio" representing her choice for President. (Intelligence runs in the Daly household.) For Mike, the process is as follows: Mike uses his Palm Pilot 150 to access the Web site shown on HiTechTV Cable 135. Mike has not registered, but registration is allowed, so the process moves from step 1905, to step 1925, where registration is allowed, and then to step 1930. In step 1930, the immersion verification question 1820*a* with answer choices is displayed. In step 1935, Mike answers 3 ("XX2040"). There is another question so the process moves from step 1940 to 1945. In step 1945, the Advertiser question 1820*b* with answer choices is displayed. In step 1950, Mike answers 3 ("within 1 year"). The same process is followed for the polling question 1820*c*, and Mike answers it. There are no additional questions, so the process moves from step 1940 to step 1926. In step 1926, because Mike does not have a CRAV ID, the process moves to step 1927 and Mike registers and gets a CRAV ID, which is automatically entered. The process then moves to step 1720.

For Mark, the process is as follows: Mark uses the bar's private network, which broadcasts the CRAV Ads and presents the Query 1820 to the Consumers 110 located within the bar who are connected to the private network and who have enrolled to play. Mark is asked for his CRAV ID in step 1902. Mark has not pre-registered, so Mark types "NONE", and the process moves to step 1905, and then to 1925. In step 1925, registration is allowed during the CRAV Ad, so the process moves to step 1930. In step 1930, the immersion verification question 1820*a* with answer choices is displayed. In step 1935, Mark answers 3 ("XX2040").

Another question is asked, so the process moves from step 1940 to 1945. In step 1945, the Advertiser question 1820*b* with answer choices is displayed. In step 1950, Mark answers 3 ("within 1 year"). Another question is asked, so the process moves from step 1940 to 1945. In step 1945, the polling question 1820*c* with answer choices is displayed. In step 1950, Mark answers 1 ("Hillary Clinton"). No other questions are asked, so the process moves from step 1940 to step 1926. In step 1926, the Device recognizes that Mark does not have a CRAV ID. The process moves to step 1927, and Mark is asked if he wishes to follow the registration process (to obtain a CRAV ID) or lose his Query 1820 response information. Mark starts to complete the registration information, but is distracted and logs off. Because he does not complete the registration, he is not assigned a CRAV ID, and his responses are discarded, as set forth in step 1928.

In step 1220 of FIG. 12, the CRAV Ad answers are gathered. This is done by the Phone Company SP 170, the Internet SP 185, the PDA SP 175, and the R-Bar Private Network SP 190 forwarding the response and applicable registration information to TPR's DCS 195.

FIG. 20 is a flow diagram illustrating how TPR uses the Data Storage Center 195 to select winners and distribute the prizes, as set forth in step 1226 and 1227 of FIG. 12. In step 2001, the process is initiated at the "START" button. In step 2005, TPR's Data Storage Center 195 stores the registration information (for those who registered during game play) and the DCS 196 stores the response information for all the registered Consumers 110, including Mr. Daly, Mrs. Daly, and Mike. In step 2010, the potential and alternates winners are randomly chosen and extracted from all the correct answers for question 1820*a* stored within the DCS 196. Mike is chosen as a one of 50 winners and Mrs. Daly is chosen as the first of 50 alternate winners. TPR begins the verification process by contacting all 50 winners. Each winner is qualified in step 2020, and as each winner is verified their name is added to the list of verified winners in step 2035, and the winner counter is increased. Ultimately, TPR contacts Mike in step 2010 to verify his CRAV ID, registration information, and response information in step 2020. Mike's registration information was falsified (he said he was 60 when registering, but in reality he is 25), so he is disqualified, because truthful answers are required as a condition of winning according to ABS Promotion rules. All of Mike's data is also purged from the Data Storage Center 195 to avoid potentially false or misleading information. This is done to maintain data base integrity. According to step 2020, because Mike's information is not correct, the first alternate winner at the top of the list is chosen, as set forth in step 2025. Mrs. Daly is the first alternate winner, so her information is verified in step 2025. Because Mrs. Daly's immersion verification question was correct, and her demographic data is proven to be accurate and verified in step 2031, so she is selected as a verified winner and added to the list in step 2032.

In step 2035, once all 50 winners have been selected and verified, the process moves to step 2040, where TPR forwards to ABS the information as to the identities of all winners, including Mrs. Daly. In step 2040, ABS and ACME also jointly announce the name of all winners, including Mrs. Daly. Included in the information passed to ABS from TPR in step 2040 is a report including demographic information for all Consumer responses for the ACME and pollster designed questions, which ABS may elect to pass along to ACME or to survey organizations who have contracted ABS to acquire polling statistics. This report is derived and data mined from the registration and response data. This information includes statistics indicating that of the 5.532 million female Consumers 110, 534,461 live in households with average incomes in excess of $75,000 per year. This information also indicates that, of these, 6.5% live in the state of Florida and are over 50 years old, and 3.443% expect to purchase a car within the next six months, 5.2% live in the metropolitan NYC area, and 0.8429% expect to purchase a new car within the next six months. The statistics also indicate that across all age groups, and all occupations, Frank Maggio will be elected President in 2008 by a 59.8% share of the popular vote.

In step 2045, TPR forwards a convertible to Mrs. Daly and the other winners. The process ends in step 2099.

Other Applications

While the above description is ideally suited for visual mass media broadcast technology such as the Broadcast TV 120, Cable TV 135, Satellite TV 140, Private Networks 125, Other Networks 141, and the Internet 130, it may also be utilized in alternate mass media channels, using audio-only technology like radio, or visual-only broadcast mediums, such as a magazine or newspaper ad. The CRAV Ads may be answered with complicated, highly developed computer Devices 111, or simply by using the Phone 145. Those practiced in the art will recognize the above invention may be implemented with any broadcast medium and response medium. In addition, the invention is not limited to providing ads with entertainment content, but can be extended to providing other types of information.

What is claimed is:

1. A method for providing advertising, comprising the steps of:

communicating through a mass media, non-interactive broadcast network a plurality of advertisements to a plurality of consumers, the plurality of advertisements comprising advertising content for each advertisement, and communicating a query about a selected portion of the advertising content of at least one of the advertisements;

presenting an offer of a reward as an incentive for each consumer to review the advertisements and to submit the response to the query; and collecting, through a medium other than the mass-media, non-interactive broadcast network, the respective response to the query from each of responding ones of the consumers, wherein receipt of each response having a correct reply to the query verifies that the responding consumer has been exposed to at least the selected portion of the advertising content.

2. The method of claim 1, wherein the step of communicating the advertisements to the consumers comprises simultaneously transmitting the advertisements through a plurality of mass media, non-interactive broadcast networks for delivery to the consumers.

3. The method of claim 1, further comprising the step of granting the reward to at least one of the consumers submitting the response to the query, wherein the reward grant is provided at a time subsequent to communication of the advertisements based upon confirmation of a correct reply to the query presented to the consumers in connection with the advertisements.

4. The method of claim 1, further comprising the step of communicating en advisory alerting the consumers to pay attention to a communication of the selected portion of the advertising content.

5. The method of claim 4, wherein presentation of the advisory to the consumers is separate from presentation of the selected portion of the advertising content to the consumers.

6. The method of claim 4, wherein the advisory is presented to the consumers at a first time and the selected portion of the advertising content is presented to the consumers at a second time, and wherein the first time is different from the second time.

7. The method of claim 4, wherein presentation of the advisory to the consumers is accomplished via a first communications media and presentation of the advertisements is accomplished via a second communications media, the first communications media being different from the second communications media.

8. The method of claim 4, wherein delivery to the consumers of the advisory and the advertisements is independent from presentation of the advisory and advertisements to the consumers.

9. The method of claim 1, further comprising the step of providing advance notice of communication of the advertisements to the consumers.

10. The method of claim 1, further comprising the step of collecting registration information from the consumers to register for the opportunity to respond to the query.

11. The method of claim 10, wherein the step of collecting registration information comprises separating, for privacy purposes, personal consumer information relating to identification of the consumers from non-personal consumer information relating to non-identifying information of the consumers.

12. The method of claim 1, further comprising the step of storing the responses to the query in response to collecting the responses from responding ones of the consumers.

13. The method of claim 1, wherein the step of communicating the advertisements to the consumers comprises:
broadcasting an advertisement comprising a Vignette including the selected portion of the advertising content to the consumers; and
broadcasting an advertisement comprising the query including at least one question to the consumers, thereby performing said step of communicating a query, wherein the consumers can respond to the query by submitting the response, each response comprising an answer to at least one question of the query.

14. The method of claim 12, wherein the step of communicating the advertisements further comprises broadcasting an advertisement comprising an Alert for providing the consumers with advance notice that the Vignette is scheduled for subsequent delivery to the consumers.

15. The method of claim 14, wherein the step of communicating the advertisements further comprises broadcasting a Sneak Peek Vignette for communicating to the consumers the Vignette or other content that can assist the consumers in answering the query, wherein the Sneak Peek Vignette is communicated to the consumers in advance of the Alert.

16. The method of claim 1, further comprising the step of communicating to the consumers an Answer to at least one question in the query after a time period of sufficient length to allow the consumers to respond to the query.

17. The method of claim 1, further comprising the step of registering the consumers for the opportunity to respond to the query.

18. A system for providing advertising, comprising:
a mass media, non-interactive broadcast network operative to communicate a plurality of advertisements to a mass audience comprising a plurality of recipients, the plurality of advertisements comprising advertising content for each advertisement and a query about a selected portion of the advertising content of at least one of the advertisements, the broadcast network further operative to communicate to the mass audience an offer of a reward as an incentive to submit a response to the query;
a plurality of response devices, each operative by one of the recipients of the advertisements to communicate, through a medium other than the mass-media, non-interactive broadcast network, a respective response to the query; and
an information gathering system operative to collect each response to the query communicated from the response devices,
wherein receipt of each response having a correct reply to the query verifies that the responding recipient has been exposed to at least the selected portion of the advertising content, and
wherein a grant of the reward is provided at a time subsequent to communication of the advertisements to at least one of the responding recipients based upon confirmation of the correct reply to the query.

19. The system of claim 18, further comprising a plurality of the mass-media, non-interactive broadcast networks, each operative to communicate the advertisements to the mass audience.

20. The system of claim 19, wherein each of the broadcast networks is operative to simultaneously communicate the advertisements for reception by the mass audience.

21. The system of claim 19, wherein the plurality of broadcast networks comprises one or more of cable, satellite, streaming Internet, and private networks.

22. The system of claim 18, wherein the broadcast network comprises at least one transmission component for transmitting the advertisements and a plurality of receive components for receiving the advertisements for presentation to the recipients, the broadcast network operative to simultaneously communicate the advertisements to the recipients.

23. The system of claim 18, further comprising a database for storing the responses to the query in response to receiving the responses collected by the information gathering system, the database further operative to store identifying information for at least the recipients registered in advance to submit the responses to the query, the identifying information useful for matching the responses to the query to the recipients that have registered to submit the responses.

24. The system of claim 18, wherein a grant of the reward occurs after the submission of each response by the recipients and is provided at a time subsequent to communication of the advertisement to the recipients based upon confirmation of the correct reply to the query.

25. The system of claim 18, wherein the advertisements further comprise an advisory alerting the recipients to pay attention to the subsequent communication of the advertisement.

26. The system of claim 25, wherein presentation of the advisory to the recipients is separate from presentation of the content to the recipients.

27. The system of claim 25, wherein the advisory is presented to the recipients at a first time and the content is presented to the recipients at a second time, and wherein the first time is different from the second time.

28. The system of claim 25, wherein presentation of the advisory to the recipients is accomplished via a first communications media and presentation of the content is accomplished via a second communications media, the first communications media being different from the second communications media.

29. The system of claim 25, wherein delivery to the recipients of the advisory and the content is independent from presentation of the advisory and content to the recipients.

30. The system of claim 18, wherein each recipient is assigned a unique identifier, and wherein each response further comprises the unique identifier for the responding recipient.

31. The system of claim 20, further comprising a database for storing the responses to the query in response to receiving the responses collected by the information gathering system, the database further operative to store identifying information for at least the recipients registered in advance to submit responses to the advertisement, wherein the stored responses to the query can be matched to the identifying information for the registered recipients based on the unique identifier.

32. The system of claim 18, wherein the plurality of advertisements comprises:
   a Vignette including the selected portion of the advertising content;
   the query; and
   an Alert for providing the recipients with notice of delivery or the Vignette to the recipients.

33. The system of claim 32, wherein the plurality of advertisements further comprises a Sneak Peek Vignette for communicating to the recipients at least a portion of the plurality of advertisements in advance of presentation of the Alert to the recipients, the Sneak Peek Vignette useful for assisting the recipients in preparing the correct reply to the query.

34. The system of claim 32, wherein presentation of the query to the recipients is separate from presentation of the Vignette to the recipients.

35. The system of claim 32, wherein communication of the Alert is separate and independent from communication of the Vignette, and presentation of the Vignette to the recipients is delayed by a time period from an earlier presentation of the Alert to the recipients.

36. The system of claim 32, wherein presentation of the Alert to the recipients is accomplished via a first communications media, presentation of the Vignette is accomplished via a second communications media, and presentation of the query is accomplished via a third communications media.

37. The system of claim 32, wherein the plurality of advertisements further comprises an Answer to at least one question in the query, the Answer being delivered to the recipients after a time period of sufficient length to allow the recipients to respond to the query.

38. A system for providing advertising via a distributed computing network, comprising:
   a mass media, non-interactive broadcast network operative to simultaneously communicate a plurality of advertisements via the distributed computer network to a mass audience comprising a plurality of recipients, the plurality of advertisements comprising advertising content for each advertisement;
   a query communications media for communicating a query about a selected portion of the advertising content of at least one of the advertisements;
   a reward communications media for communicating an offer of a valuable reward as an incentive to submit a response to the query;
   a plurality of response devices, each operable by a recipient of the advertisements to communicate, through a medium other tan the mass-media, non-interactive broadcast network, a respective response to the query; and
   an information gathering system operative to collect each response to the query communicated from the response devices,
   wherein receipt of each response having a correct reply to the query verifies that the responding recipient has been exposed to at least the selected portion of the advertising content, and
   wherein a grant of the reward is based upon confirmation of the correct reply to the query, the reward grant provided at a time delayed from the communication of the response by the response devices and subsequent to communication of the advertisements to the recipients.

39. The system of claim 38, wherein the advertisements are communicated to the mass audience via an electronic mail message carried by the distributed computer network.

40. The system of claim 38, further comprising an alert communications media for communicating an alert providing the audience with advance notice that the advertisements are scheduled for delivery to the audience.

41. The system of claim 40, wherein the alert is communicated to the mass audience via an electronic mail message carried by the distributed computer network.

42. The system of claim 41, wherein the advertisements are communicated to the mass audience via an electronic mail message carried by the distributed computer network.

43. The system of claim 40, wherein the advertisements are available for communication to the mass audience as streaming multimedia content distributed via the distributed computer network.

44. The system of claim 38, wherein at least one of the response devices comprises a computing device coupled to the information gathering system, and wherein the response is communicated from the responding recipient as an electronic mail message transmitted by the computing device via the information gathering system.

45. The system of claim 44, wherein the information gathering system comprises the Internet and is operative to receive the electronic mail message containing the response from the computing device.

46. The system of claim 44, wherein the information gathering system comprises a private network and the computing device comprises a personal recording device (PRD) coupled to the private network.

47. The system of claim 38, further comprising a database for storing the responses to the query in response to receiving the responses collected by the information gathering system, the database further operative to store identifying information for at least the recipients registered in advance to submit responses to the query, the identifying information useful for matching the responses to the query to the recipients that have registered to submit the responses.

48. The system of claim 38, wherein a grant of the reward is delayed from the submission of each response by the recipients and is provided at a time subsequent to communication of the advertisements to the recipients based upon confirmation of the correct reply to the query.

49. The system of claim 38, further comprising an alert communications media for communicating an advisory alerting the recipients to pay attention to communication of the advertisements,
   wherein presentation of the advisory is separate from presentation of the selected portion of the advertising content to the recipients.

50. The system of claim 38, further comprising an alert communications media for communicating an advisory alerting the recipients to pay attention to communication of the advertisements, wherein the advisory is presented to the recipients at a first time and the selected portion of the advertising content is presented to the recipients at a second time, and wherein the first time is different from the second time.

51. The system of claim 38, further comprising an alert communications media for communicating an advisory alerting the recipients to pay attention to communication of the advertisements, wherein presentation to the recipients of the advisory is accomplished via a first communications media and presentation of the selected portion of the advertising content is accomplished via a second communications media, the first communications media being different from the second communications media.

52. The system of claim 38, further comprising an alert communications media for communicating an advisory alerting the recipients to pay attention to communication of the advertisements, wherein delivery to the recipients of the advisory and the selected portion of the advertising content is independent from presentation of the advisory and selected portion of the advertising content to the recipients.

53. The system of claim 38, wherein the plurality of advertisements comprises:

a Vignette comprising the selected portion of the advertising content;

the query; and an Alert for providing the recipients with notice of delivery of the Vignette to the recipients.

54. The system of claim 53, wherein the plurality of advertisements further comprises a Sneak Peek Vignette for communicating to the recipients at least a portion of the advertising content in advance of presentation of the Alert to the recipients, the Sneak Peek Vignette useful for assisting the recipients in preparing the correct reply to the query.

55. The system of claim 53, wherein presentation of the query to the recipients is separate from presentation of the Vignette to the recipients.

56. The system of claim 53, wherein communication of the Alert is separate and independent from communication of the Vignette, and presentation of the Vignette to the recipients is delayed by a time period from an earlier presentation of the Alert to the recipients.

57. The system of claim 53, wherein presentation of the Alert to the recipients is accomplished via a first communications media, presentation of the Vignette is accomplished via a second communications media, and presentation of the query is accomplished via a third communications media.

58. A method for providing advertising content, comprising:

communicating through a mass media, non-interactive broadcast network a plurality of advertisements to a plurality of recipients, the plurality of advertisements comprising advertising content for each advertisement;

communicating a query about a selected content portion of at least one of the advertisements;

presenting an offer of a reward as an incentive for each recipient to submit a response to the query;

collecting, trough a medium other than the mass-media, non-interactive broadcast network, the response to the query from each of responding ones of the recipients, wherein receipt of each response having a correct reply to the query verifies that the responding recipient has been exposed to at least the selected content portion; and granting the reward to at least one of the recipients submitting the response to the query, wherein the reward grant is delayed from the submission of the response by the recipients and is provided at a time subsequent to communication of the advertisements based upon confirmation of a correct reply to the query presented to the recipients in connection with the advertisements.

59. The method of claim 58, wherein the step of granting the reward comprises:

searching recipient information submitted by the recipients for qualifying recipients;

randomly choosing winners from the qualifying recipients; and contacting the winners.

60. The method of claim 59, wherein the step of randomly choosing winners comprises choosing winners and alternate winners to be used in case one of the winners cannot receive the reward.

61. The method of claim 60, further comprising:

contacting the winners to verify the winners' recipient information; and removing the name of any winner that cannot verify the respective winner's recipient information.

62. The method of claim 58, further comprising the step of providing advance notice of communication of the advertisements to the recipients.

63. The method of claim 58, wherein the communicating and collecting steps comprise:

broadcasting an advertisement comprising a Vignette including the selected content portion to the recipients;

broadcasting an advertisement comprising the query including at least one question to the recipients, thereby performing said step of communicating a query; and allowing the recipients to answer at least one question from the query.

64. The method of claim 63, wherein each question in the query comprises at least one of an immersion verification question which refers to information covered in the Vignette, a trivia question, a polling question, a demographic information question, a recipient information questions a recipient preference question, and a purchasing habit question.

65. The method of claim 63, further comprising the step of broadcasting an Alert for providing the recipients wit advance notice that the Vignette is scheduled for subsequent delivery to the recipients.

66. The method of claim 65, further comprising the step of broadcasting a Sneak Peek Vignette for communicating to the recipients one of the Vignette and other content that will help the recipients answer the query, wherein the Sneak Peek Vignette is communicated to the recipients in advance of the Alert.

67. The method of claim 63, wherein the step of allowing the recipients to answer at least one question from the query comprises:

asking the recipients to enter an identification verification issued to respective recipients after the recipients have registered; and allowing the recipients to answer at least one question in the query if the recipients enter the correct identification verification.

68. The method of claim 69, wherein the step of allowing the recipients to answer at least one question from the query further comprises not allowing the recipients to answer at least one question from the query if the recipients do not enter the correct identification verification.

69. The method of claim 67, wherein the step of allowing the recipients to answer at least one question from the query further comprises allowing the recipients to answer at least one question from the query and complete the registration and be issued the identification verification if the recipients do not enter the correct identification verification.

70. The method of claim 58, further comprising the step of broadcasting an Answer to at least one question in the query, the Answer delivered to the recipients only after a passage of a time period of sufficient length to allow the recipients to respond to the query.

71. The method of claim 58, wherein the response comprises a printed response completed by one of the recipients, and wherein said collecting step comprises delivering the printed response from the recipient to a data storage center operative to collect and process each written response.

72. The method of claim 58, wherein the broadcast network comprises a mail carrier system operative to deliver the message via a mass mailing to the recipients.

73. The method of claim 58, wherein the broadcast network comprises a private network for communicating the advertisements to personal recording devices (PRD) associated with a plurality of the recipients, the PRDs operative to receive the advertisements from the private network for subsequent presentation to the recipient.

74. The method of claim 58, wherein the collecting step comprises the step of receiving the response through at least one response device comprising a personal recording device (PRD) operative to receive the advertisements and to transmit the response for communication to a data storage center.

* * * * *